(12) United States Patent
Otsuka et al.

(10) Patent No.: US 6,510,024 B2
(45) Date of Patent: Jan. 21, 2003

(54) MAGNETIC HEAD AND METHOD OF MANUFACTURING THE SAME

(75) Inventors: Yoshinori Otsuka, Kanagawa (JP); Ikuya Tagawa, Kanagawa (JP); Yukinori Ikegawa, Kanagawa (JP); Tomoko Kutsuzawa, Kanagawa (JP); Yuji Uehara, Kanagawa (JP); Minoru Hasegawa, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/906,910

(22) Filed: Jul. 17, 2001

(65) Prior Publication Data

US 2001/0050830 A1 Dec. 13, 2001

Related U.S. Application Data

(62) Division of application No. 09/199,722, filed on Nov. 25, 1998, now Pat. No. 6,282,776.

(30) Foreign Application Priority Data

Jun. 30, 1998 (JP) .......................................... 10-184780

(51) Int. Cl.[7] .............................................. G11B 5/147
(52) U.S. Cl. ..................................................... 360/126
(58) Field of Search ................................. 360/125, 126, 360/123, 97.01; 29/603.07, 603.14, 603.15

(56) References Cited

U.S. PATENT DOCUMENTS

| | | | |
|---|---|---|---|
| 4,652,954 A | | 3/1987 | Church |
| 4,881,144 A | | 11/1989 | Yuito et al. |
| 5,296,979 A | * | 3/1994 | Kawabe et al. .......... 360/97.01 |
| 5,313,356 A | | 5/1994 | Ohkubo et al. |
| 5,438,747 A | | 8/1995 | Krounbi et al. |
| 5,701,221 A | | 12/1997 | Taniyama et al. |
| 5,871,885 A | | 2/1999 | Roh |
| 5,872,693 A | | 2/1999 | Yoda et al. |
| 5,878,481 A | * | 3/1999 | Feng et al. ............... 29/603.15 |
| 5,912,790 A | | 6/1999 | Yoda et al. |
| 5,932,396 A | * | 8/1999 | Kamijima ................. 29/603.07 |
| 5,995,343 A | | 11/1999 | Imamura |
| 6,034,847 A | | 3/2000 | Komuro et al. |
| 6,243,939 B1 | * | 6/2001 | Chen et al. ............... 29/603.14 |
| 6,274,256 B1 | * | 8/2001 | Watanabe et al. ........... 360/126 |
| 6,301,075 B1 | * | 10/2001 | Sato .......................... 360/126 |
| 6,304,414 B1 | * | 10/2001 | Crue, Jr. et al. ............ 360/126 |
| 6,327,116 B1 | * | 12/2001 | Watanabe et al. ........... 360/126 |

FOREIGN PATENT DOCUMENTS

| | | |
|---|---|---|
| EP | 442 213 | 8/1991 |
| EP | 452 846 | 10/1991 |
| EP | 479 252 | 4/1992 |
| EP | 9-180127 | 7/1997 |
| JP | 60-10409 | 1/1985 |
| JP | 62-132209 | 6/1987 |
| JP | 1-130312 | 5/1989 |
| JP | 2-58718 | 2/1990 |
| JP | 4-188418 | 7/1992 |
| JP | 6-068421 | 3/1994 |
| JP | 6-267023 | 9/1994 |
| JP | 8-111006 | 4/1996 |
| JP | 8-129715 | 5/1996 |
| JP | 8-263807 | 10/1996 |
| JP | 8-339513 | 12/1996 |
| JP | 9-106508 | 4/1997 |
| WO | 98/34221 | 8/1998 |

* cited by examiner

*Primary Examiner*—Allen Cao
(74) *Attorney, Agent, or Firm*—Greer, Burns & Crain, Ltd.

(57) ABSTRACT

There is provided a magnetic head which is able to enhance the magnetic field intensity to be generated by shaping a magnetic pole, and a method of manufacturing the same. The method of manufacturing a magnetic head, comprising the steps of forming a lower recording magnetic pole and an upper recording magnetic pole, and trimming partially an elongated pole in the vicinity of a floating surface of the upper recording magnetic pole and an upper portion of the lower recording magnetic pole positioned below and around the elongated pole by an ion milling method, wherein a core width of the elongated pole can be adjusted.

2 Claims, 25 Drawing Sheets

FIB equipment

Ion milling equipment

US 6,510,024 B2

MAGNETIC HEAD AND METHOD OF MANUFACTURING THE SAME

This is a divisional, of Ser. application No. 09/199,722, filed Nov. 25, 1998 now U.S. Pat. No. 6,282,776.

BACKGROUND OF THE INVENTION

1. (Field of the Invention)

The present invention relates to a magnetic head employed in a magnetic recording device such as a magnetic disk drive, a magnetic tape recorder, etc., and a method of manufacturing the same.

2. (Description of the Prior Art)

As a magnetic head employed in a magnetic recording device such as a magnetic disk drive, a magnetic tape recorder, etc., there are an inductive type recording/reproducing head and a composite magnetic head which is equipped with both an inductive type recording head and a magnetoresistive reproducing head.

In recent years, with the higher density in the magnetic disk drive, etc., higher performance of the magnetic head has been requested. To provide a magnetic head which satisfies such a request there has been much interest in, the MR head which does not depend upon the speed of the magnetic recording medium which, can be installed into the small disk drive, and can output the high output.

In order to realize the high recording density in such magnetic head, both the linear recording density and the track density of the magnetic recording medium must be improved. Correspondingly, there is a demand for a magnetic head which has a narrower core width, can record up to the high frequency, and has less of the side fringing of recording or ooze. "Side fringing of recording" means a phenomenon that a recording magnetic field is spread out along the track width direction in writing to exert an influence upon a track adjacent to the object track.

In the thin film magnetic head such as a head into which an MR head is installed, a magnetic head which is called a composite head has been well known. The composite head is formed by laminating a multi-layered reproducing head RE which reads magnetic information from a magnetic recording medium, and a multi-layered recording head WR which writes information magnetically onto the magnetic recording medium in the layer laminating direction.

A boundary member between the reproducing head RE and the recording head WR, i.e. one layer of a pair of magnetic shielding layers of the reproducing head RE positioned on the recording head side (referred to as "upper reproducing magnetic shielding layer" or simply "upper magnetic shielding layer" hereinafter) is used commonly to one layer of a pair of magnetic poles of the recording head WR positioned on the recording head side (referred to as "lower recording magnetic pole" or simply "lower magnetic pole" hereinafter). Therefore, certain constraints are imposed upon a shape of the layer and a side surface (ABS (Air Bearing Surface) or floating surface) which faces the magnetic recording medium, of the lower magnetic pole of the recording head WR is formed inevitably wider than the recording track width of the magnetic recording medium. For this reason, the recording magnetic field generated from the lower magnetic pole in writing operation is spread widely in the track direction of the recording medium. As a result, it is difficult to improve the recording density by narrowing the track width to reduce a track pitch.

The lower magnetic pole and the upper magnetic pole are connected to each other in a central area of a spiral recording coil 12. The recording magnetic field is generated between the ABS of the lower magnetic pole and the ABS of the upper magnetic pole. In order to improve the recording density, it is desired that the ABS of the upper magnetic pole be shaped as minute as possible and thus the side fringing of recording must be reduced.

(Problems to be Overcome by the Invention)

In the recording head, the magnetic field intensity applied to the recording medium is normally set about two times the coercive force Hc of the recording medium. The coercive force Hc of the recent recording medium is approximately 2500 Oe (Oersted). Hence, an object of the present invention is that the magnetic head have a recording magnetic field of about 5000 Oe.

A second object of the present invention is to have the core width of the upper recording magnetic pole (longitudinal dimension of the ABS) of less than 1 μm.

However, the upper recording magnetic pole is formed the interlayer insulating layer formed on the lower recording magnetic pole. Since the recording coil to be positioned above the lower recording magnetic pole is buried in the interlayer insulating layer, such interlayer insulating layer has a large step (high step) on its surface. As shown in FIG. 1A, if liquid resist is coated on the interlayer insulating layer 111 having the high step to form the upper magnetic pole, the resist 115 has such a tendency, because of flowability of resist, that the film thickness becomes relatively thin on the high step portion (flat portion) but the film thickness becomes relatively thick on the low step portion (step bottom portion) because of stagnant resist.

Therefore, in forming the upper magnetic pole, the upper magnetic pole must be plated on the surface of the interlayer insulating layer 111 having the high step, then patterned, and the like. In order to form the upper magnetic pole of a predetermined film thickness, about 6 μm is needed as the film thickness of the resist on the flat portion. In this case, the film thickness of the resist on the step bottom becomes about 10 μm.

It is very difficult to accomplish the target core width of 1 μm on the ABS of the upper magnetic pole by using the resist having the film thickness of more than 10 μm.

As the countermeasure to overcome the problem, the applicant of this application has proposed previously the technology, as disclosed in Japanese Patent Application No. 9-109845 filed on Apr. 25, 1997 in Japan (which application has not been laid open to public at the application date of this Japanese application), that the upper recording electrode is partially trimmed by using the focused ion beam (FIB) method.

The technology disclosed in this Japanese Patent Application No.9-109845 document is that, in steps of manufacturing the composite magnetic head, the upper recording electrode is locally trimmed and shaped from the ABS side by using the focused ion beam method to narrow the core width before or after it is cut out into the slider at the final stage.

FIG. 1B is a view showing trimming of the upper magnetic pole by using the focused ion beam method. As schematically shown in FIG. 1B, in the magnetic head in which the upper magnetic pole is formed, the upper magnetic pole 116 covers partially the spiral recording coil 112. The upper magnetic pole 116 has an elongated (i.e. long and narrow) pole 16a being directed to the recording medium.

FIG. 1C is an enlarged view showing trimming of elongated pole 116a by using the focused ion beam method.

More particularly, after the upper magnetic pole 116 is patterned, both sides of the elongated pole contacting the gap layer in the upper magnetic pole 116 and the lower magnetic pole located below and around the elongated pole are trimmed by irradiating the focused ion beam. According to this trimming process, the elongated pole width 116a of the upper magnetic pole 116 is shaped into a desired shape and at the same time grooves or concave portions are formed on the upper portion of the lower magnetic pole located below and on both sides of the elongated pole.

FIG. 2 is a view showing a focused ion beam equipment. This equipment comprises a pattern drawing portion which includes an ion source, a lens system, a stage, etc., and a control and data processing portion. Since the ion beam has a good straight propagation property, the focused ion beam method has a feature to enable very fine pattern formation. In addition, the fine patterns with a high aspect ratio can be formed.

Therefore, if the focused ion beam method is employed, the elongated pole 116a can be shaped into desired fine patterns by the trimming process. If the upper magnetic pole with the elongated pole which is shaped into such desired fine patterns is employed, spread of the recording magnetic field generated between the upper magnetic pole and the lower magnetic pole in the track width direction can be suppressed to the lowest minimum. As a result, the magnetic head having such upper magnetic pole can record information onto the magnetic recording medium having the high track density.

Nevertheless, executing the trimming process of the magnetic pole by using the focused ion beam method is very poor in productivity at the existing state. The focused ion beam method can be executed by the FIB equipment shown in FIG. 2. In order to trim the core width of the shaped elongated pole within 1 $\mu$m, the ion beam is focused to the predetermined positions on both sides of the elongated pole every head and then the pattern drawing area is set to effect the trimming operation.

Since a plurality of heads are formed on the substrate, plenty of time is needed to repeat the steps by the number of heads. For example, if a processing time per head is set to about 10 seconds, one day or more (27.7 times) is consumed to process a sheet of wafer since about 10,000 heads are incorporated in the wafer of five(5)-inch in diameter which is relatively small in size.

In order to utilize the magnetic head in actual production, the processing time must be shortened considerably and also a large number of FIB equipments must be installed, but they are not practical solutions. Therefore, a new technology which can be replaced with the magnetic head manufacturing method employing the focused ion beam is needed.

Furthermore, it is more important that the above technology in Japanese Patent Application 9-109845 document has disclosed the partial trimming process of the upper magnetic pole and the lower magnetic pole, but it is silent on the trimmed range, i.e., the trimmed shape which provides good influence on characteristics of the magnetic head.

Therefore, it is an object of the present invention to provide a novel magnetic head in light of the above problems.

It is another object of the present invention to provide a magnetic head having a narrow core width suitable for high density recording.

It is still another object of the present invention to provide a method of manufacturing a new magnetic head.

It is yet still another object of the present invention to provide a magnetic head having a narrow core width suitable for high density recording.

SUMMARY OF THE INVENTION

According to the present invention, there is provided a method of manufacturing a magnetic head, comprising the steps of:
  forming a lower recording magnetic pole and an upper recording magnetic pole; and
  trimming partially an elongated pole in the vicinity of a floating surface of the upper recording magnetic pole and an upper portion of the lower recording magnetic pole positioned below and around the elongated pole by an ion milling method; whereby a core width of the elongated pole is adjusted.

By employing the ion milling method, the trimming processing time can be reduced extremely rather than the FIB method. The side fringing or ooze of recording can be reduced much more by trimming not only the upper recording magnetic pole but also the upper portion of the lower recording magnetic pole.

In the method of manufacturing a magnetic head according to the present invention, the ion milling method sets an ion incident angle $\theta i$, relative to a side surface of the upper recording magnetic pole, within a range of 65 to 85 degree. Accordingly, reduction in film thickness of the surface of the upper magnetic pole can be substantially prevented.

In the method of manufacturing the magnetic head according to the present invention, a recording gap layer and an upper portion of the lower recording magnetic pole are adjusted substantially identically to a core width of the elongated pole by the ion milling method. Accordingly, the recording ooze can be reduced still more.

According to the present invention, there is provided a method of manufacturing a composite magnetic head into which a reproducing head and a recording head are incorporated, comprising the steps of:
  forming a lower recording magnetic pole;
  forming a recording gap film on the lower recording magnetic pole;
  forming a recording coil, which is buried in a nonmagnetic insulating film, on the recording gap film;
  forming an upper recording magnetic pole on the nonmagnetic insulating film; and
  trimming partially the upper recording magnetic pole and the lower recording magnetic pole by an ion milling method; whereby a core width of the upper recording magnetic pole is shaped and an upper portion of the lower recording magnetic pole is formed to coincide with the core width.

The method of manufacturing a composite magnetic head according to the present invention, further comprises the steps of:
  forming a plating base layer on the nonmagnetic insulating film before the step of forming the upper recording magnetic pole; and
  forming a reflection preventing film on the plating base layer.

The method of manufacturing a composite magnetic head according to the present invention, further comprises the step of:
  forming a reflection protecting layer on the recording gap film after the step of forming the recording gap film. Because of the reflection protecting layer, exposure of the photoresist by the reflected light can be eliminated, and thus the upper magnetic pole can be formed into a precise shape.

In the method of manufacturing the composite magnetic head according to the present invention, in the step of trimming partially the upper recording magnetic pole and the lower recording magnetic pole by an ion milling method, a first trimming is carried out at an ion incident angle within a range of 20 to 40 degree, and a second trimming is carried out at the ion incident angle within a range of 65 to 85 degree.

According to the present invention, there is provided a composite magnetic head comprising:

a reproducing head; and a recording head;

wherein the recording head includes a lower magnetic pole, a recording gap layer, a nonmagnetic insulating layer into which a recording coil is buried, and an upper magnetic pole, the upper magnetic pole is shaped by trimming process, and the upper magnetic pole has a step height Dh of less than 5.0 μm, the step height Dh being a height from a bottom location of a step formed by the trimming process to a floating surface.

In the composite magnetic head according to the present invention, the upper magnetic pole has the step height Dh of less than 3.0 μm, the step height Dh being the height from the bottom location of the step formed by the trimming process to the floating surface.

For example, as shown in FIG. 15, high magnetic field intensity can be obtained by defining the step height Dh.

According to the present intention, there is provided a composite magnetic head comprising:

a reproducing head; and a recording head;

wherein the recording head includes a lower magnetic pole, a recording gap layer, a nonmagnetic insulating layer into which a recording coil is buried, and an upper magnetic pole, the upper magnetic pole is shaped by trimming process, and the upper magnetic pole has an elongated pole in pole length P1, which is a magnetic pole film thickness formed by the trimming process, of more than 2.5 μm.

In the composite magnetic head according to the present invention, the upper magnetic pole has the elongated pole length P1, which is the magnetic pole film thickness formed by the trimming process, of more than 3.0 μm.

According to the present invention, there is provided a composite magnetic head comprising:

a reproducing head; and a recording head;

wherein the recording head includes a lower magnetic pole, a recording gap layer, a nonmagnetic insulating layer into which a recording coil is buried, and an upper magnetic pole, the upper magnetic pole is shaped by trimming process, and the upper magnetic pole has an elongated pole in the vicinity of a floating surface and a fan-shaped portion connected to the elongated pole, and has a neck height Nh of less than 3.0 μm, the neck height Nh being a height from a floating surface of the elongated pole to the fan-shaped portion.

In the composite magnetic head according to the present invention. the neck height Nh is less than 2.0 μm.

For example, as shown in FIG. 17, high magnetic field intensity for the predetermined pole length P1 can be obtained by defining the neck height Nh.

BRIEF DESCRIPTION OF THE DRAWINGS

FIGS. 1A to 1C are views showing a magnetic head in the prior art, wherein FIG. 1A is a view showing the problem in manufacturing a thin film magnetic head in the prior art, FIG. 1B is a view showing a trimmed portion of an upper magnetic pole, and FIG. 1C is a view showing trimming of the upper magnetic pole by a focused ion beam method;

DESCRIPTION OF THE PREFERRED EMBODIMENTS

Embodiments of the present invention will be explained in detail with reference to the accompanying drawings hereinafter.

[Composite Magnetic Head]

(Configuration of the Composite Magnetic Head)

Figure 1A:
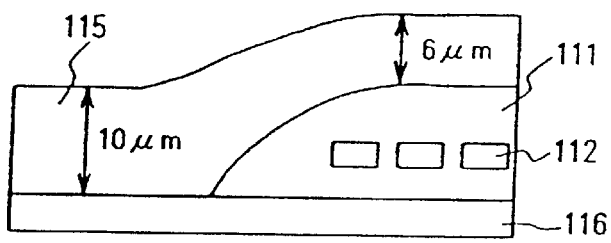
Figure 1B:
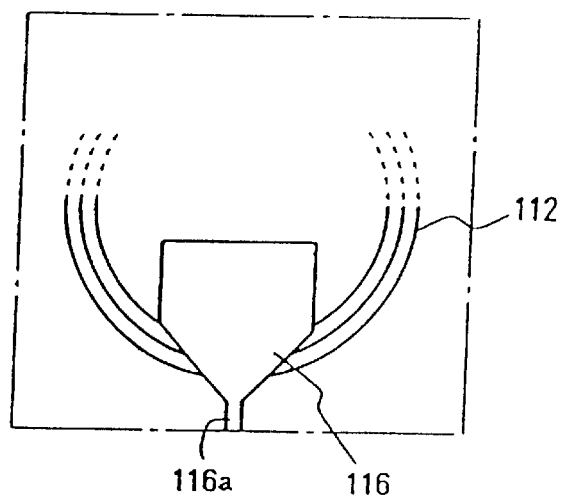
Figure 1C:
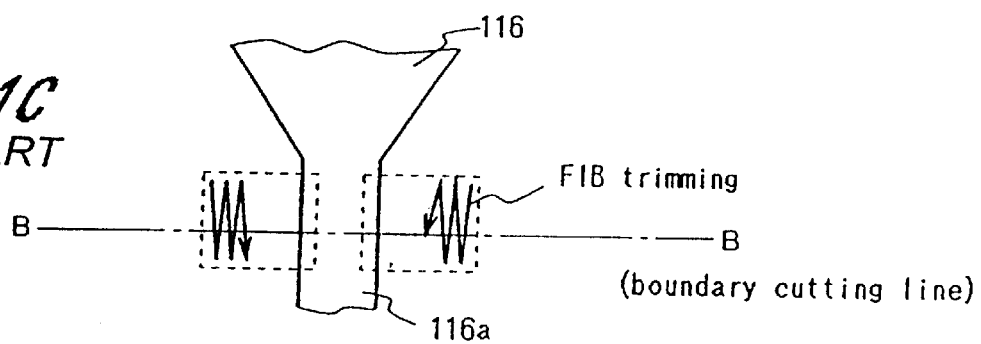
Figure 2:
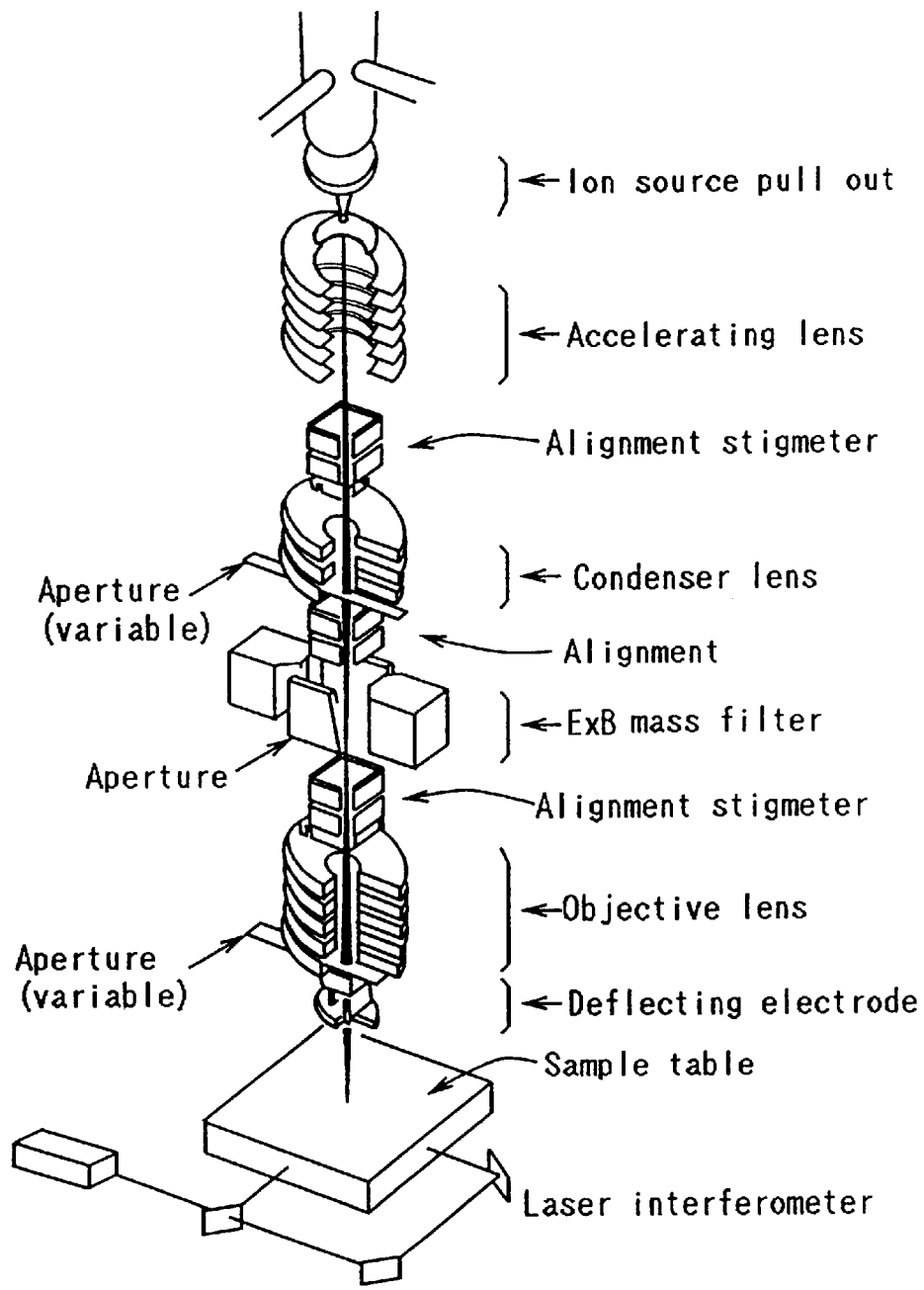
FIG. 2 is a view showing an FIB equipment.
Figure 3:
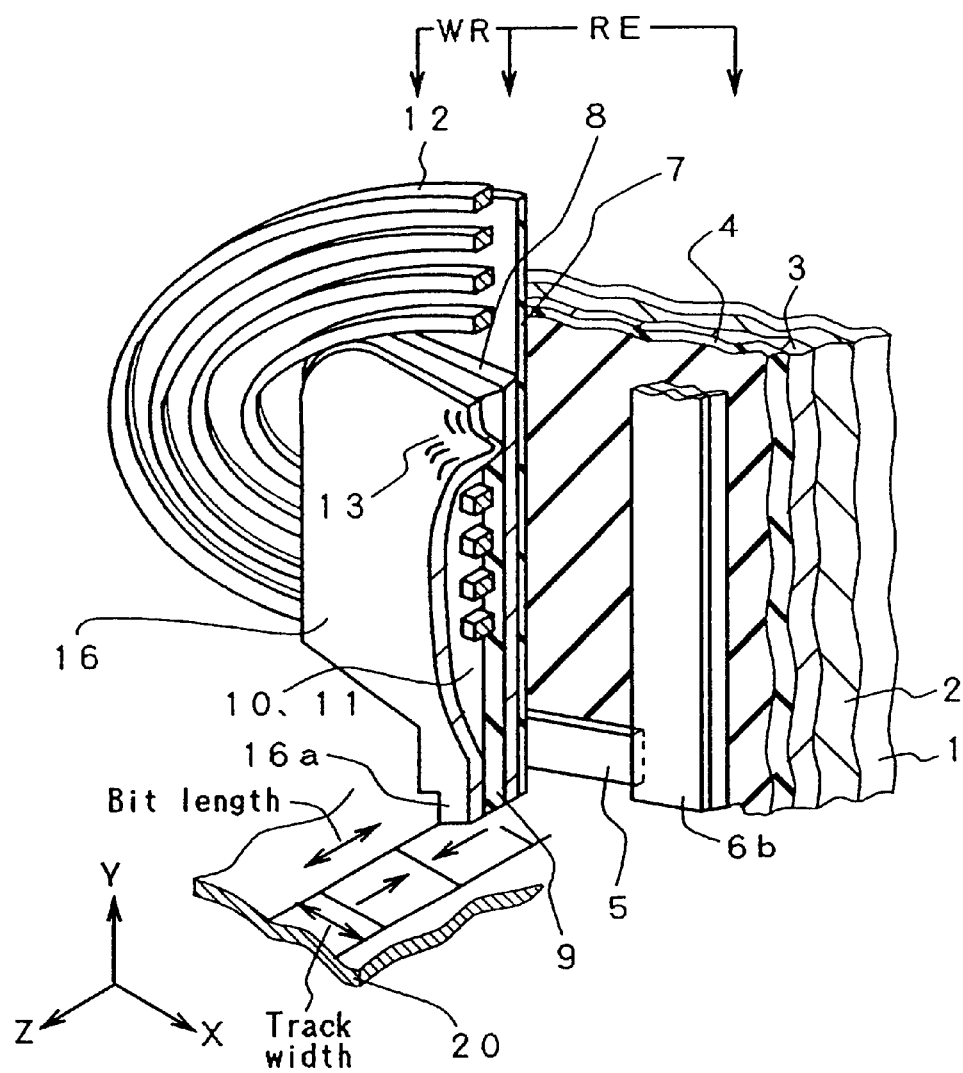
FIG. 3 is an exploded perspective view showing a pertinent portion of a composite magnetic head.

FIG. 3 is an exploded perspective view showing a pertinent portion of the composite magnetic head. In this exploded perspective view, in order to make clear the inside of the magnetic head, an uppermost layer acting as a protection layer is omitted and also the left half portion of the recording head WR is deleted from FIG. 3.

The composite magnetic head comprises a substrate 1, a substrate protection film 2 formed on the substrate, a reproducing head RE formed on the substrate protection film, a recording head WR formed on the reproducing head, and a protection layer (not shown) formed on the recording head.

The reproducing head RE comprises a lower reproducing magnetic shielding layer 3, a first nonmagnetic insulating layer (lower reproducing gap layer) 4 formed on the lower reproducing magnetic shielding layer, a magnetic transducer 5 formed on the first nonmagnetic insulating layer, a pair of terminals 6a, 6b (only one terminal is shown) formed on both ends of the magnetic transducer, a second nonmagnetic insulating layer (upper reproducing gap layer) 7 formed on the magnetic transducer and the pair of terminals, and an upper reproducing magnetic shielding layer 8 formed on the second nonmagnetic insulating layer. More particularly, the reproducing head RE has such a structure that both surfaces of the magnetic transducer 5 and the pair of terminals 6a, 6b along the Z direction are covered with the first and second nonmagnetic insulating layers 4,7 and also both sides of the first and second nonmagnetic insulating layers 4,7 are covered with the lower and upper reproducing magnetic shielding layers 3,8.

The upper reproducing magnetic shielding layer 8 is a merge type layer which is used commonly as a lower magnetic pole of the recording head WR to be described subsequently, i.e., acts as both the upper reproducing magnetic shielding layer and the lower recording magnetic pole. Hence, in this disclosure, the upper reproducing magnetic shielding layer/lower recording magnetic pole 8 may be expressed as either the upper (reproducing) magnetic shielding layer or the lower (recording) magnetic pole.

The recording head WR comprises a lower recording magnetic pole 8, a recording gap layer 9, a spiral recording coil 12 arranged in the recording gap layer, third and fourth nonmagnetic insulating layers 10, 11 formed to cover the recording coil, and an upper recording magnetic pole 16 formed on the third and fourth nonmagnetic insulating layers. In other words, the recording head WR is so constructed that both surfaces of the recording gap layer 9 in which the recording coil 12 is embedded, and the third and fourth nonmagnetic insulating layers 10, 11 are covered with the lower recording magnetic pole 8 and the upper recording magnetic pole 16.

The recording coil 12 is not provided in a spiral central area 13 of the recording coil 12. The upper recording magnetic pole 16 is concaved in the central area 13 to be connected to the lower recording magnetic pole 8. Also, the upper recording magnetic pole 16 is tapered toward the magnetic recording medium 20, and this portion is called especially an elongated pole 16a.

In this manner, the composite magnetic head shown in FIG. 3 has a piggyback structure in which the recording head WR is attached to the back of the reproducing head RE. In order to make clear the positional (relationship between respective elements of the magnetic head, as shown in FIG. 3, an ABS (Air Bearing Surface) of the upper recording magnetic pole 16 is set as the X direction, a depth direction of the magnetic head, if viewed from the ABS, is set as the Y direction, and a laminated layer direction of the magnetic head is set as the Z direction.

Next, respective elements constituting such composite magnetic head will be explained hereinbelow.

The substrate 1 is a substantially disk-shaped wafer which is made of material such as alumina-titanium-carbide ($Al_2O_3TiC$), ferrite, calcium titanate, etc., for example.

The substrate protection film 2, the first nonmagnetic insulating layer 4, the second nonmagnetic insulating layer 7, and the recording gap layer 9 each are made of $Al_2O_3$, for example. The recording gap layer 9 has a thickness of about 0.2 to 0.6 $\mu$m. A recording magnetic field is generated between the elongated pole 16a of the upper recording magnetic pole 16 and the ABS of the second nonmagnetic insulating layer 7, formed on both sides of the recording gap layer 9 respectively, so as to write information into the magnetic recording medium 20.

The lower reproducing magnetic shielding layer 3, the upper reproducing magnetic shielding layer/lower recording magnetic pole 8, and the upper recording magnetic pole 16 each are made of NiFe alloy, etc., for example. Alternatively, for example, Co alloy such as CoNiFe, CoZr, etc., and Fe alloy such as FeN, FeNZr, etc. may be utilized. A thickness of the upper recording magnetic pole 16 is about several $\mu$m.

As the magnetic transducer 5, anisotropic magnetoresistive device (MR device), typically the giant magnetoresistive device (GMR device) such as the spin valve magnetoresistive device, etc. may be employed, for example. A pair of terminals 6a, 6b are connected to both ends of the magnetic transducer 5 respectively. In a reading operation, a constant current (sense current) is flown to the magnetic transducer 5 via the terminals.

The composite magnetic head is positioned such that it faces the recording medium 20 such as a magnetic disk to separate therefrom by a minute distance (floating amount). While moving relatively along the track longitudinal direction of the recording medium 20, the composite magnetic head reads magnetically recorded information recorded on the magnetic recording medium 20 by the reproducing head RE and also writes magnetically information into the recording medium 20 by the recording head WR. A surface of the magnetic head facing the magnetic recording medium 20 is called the ABS (Air Bearing Surface) or the floating surface.

Figure 4A:
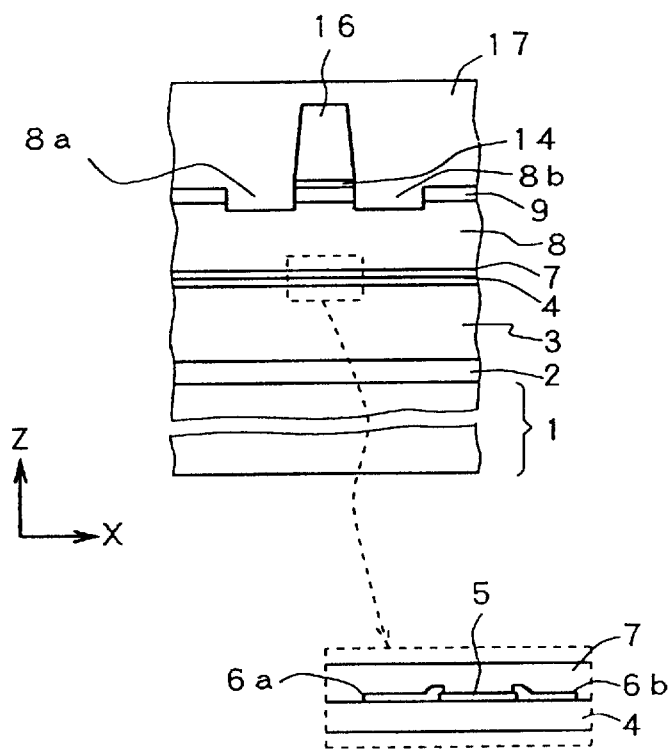
FIG. 4A is a sectional view showing the composite magnetic head, taken along a line A—A in FIG. 4B.
Figure 4B:
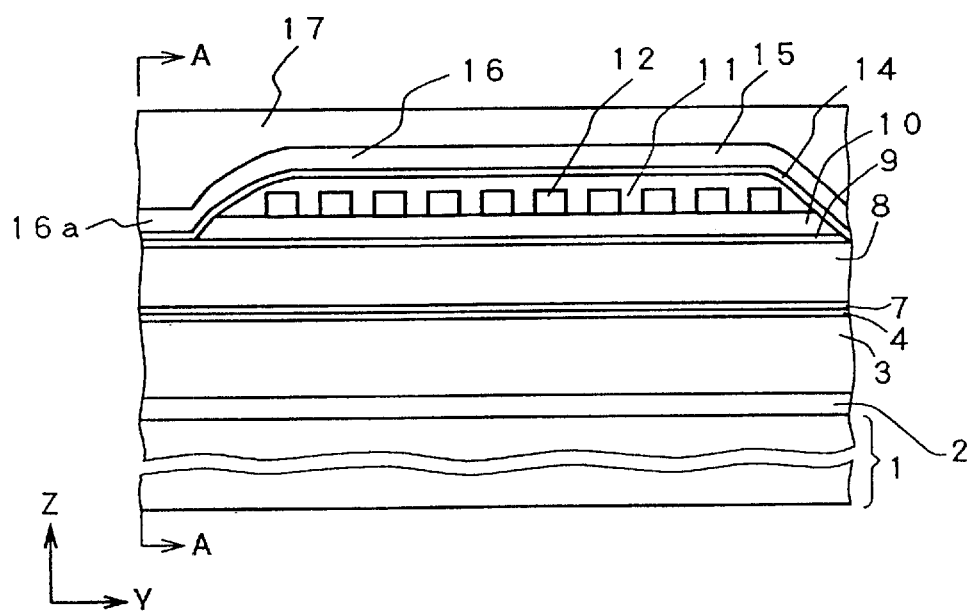
FIG. 4B is a sectional view showing the composite magnetic head, taken in the x direction of FIG. 3.

FIG. 4A is a sectional view showing the ABS of the composite magnetic head when viewed from the recording medium 20. FIG. 4B is a sectional view showing a Y-Z surface of the composite magnetic head passing through a center of the recording coil 12. In this case, FIG. 4A corresponds to a sectional view taken along a line A—A in FIG. 4B.

As can be seen from FIGS. 4A and 4B, the magnetic head RE comprises, in order from the bottom, a substrate 1, a protection layer 2 formed on the substrate, a lower magnetic shielding layer 3 formed on the protection layer, a first nonmagnetic insulating layer 4, a magnetic transducer 5 and a pair of terminals 6a, 6b formed on the first nonmagnetic insulating layer, a second nonmagnetic insulating layer 7 formed on the first nonmagnetic insulating layer 4 to cover the magnetic transducer and the pair of terminals, an upper magnetic shielding layer/lower magnetic pole 8 formed on the second nonmagnetic insulating layer, a gap layer 9 formed on the lower magnetic pole, a third nonmagnetic insulating layer 10 formed on the gap layer, a spiral recording coil 12 formed on the third nonmagnetic insulating layer, a fourth nonmagnetic insulating layer 11 for covering the recording coil, a plating base layer 14 formed on the fourth nonmagnetic insulating layer, an upper magnetic pole 16 formed on the plating base layer, and a protection layer 17 formed on the upper magnetic pole.

As shown in a partially enlarged view in connection with FIG. 4A, the magnetic transducer 5 is put between the first nonmagnetic insulating layer 4 and the second nonmagnetic insulating layer 7. A pair of terminals 6a, 6b are connected to both ends of the magnetic transducer 5 respectively.

As shown in FIG. 4B, in the magnetic head, the upper magnetic pole 16 is formed as an elongated or taper-shaped pole 16a toward the ABS. Though described in detail later, a pair of grooves or concave portions 8a, 8b are formed on the surface of the lower magnetic pole 8 facing the upper magnetic pole 16 on both sides of a portion positioned directly below the elongated pole 16a.

(Method of Manufacturing the Composite Magnetic Head)

Figure 5:
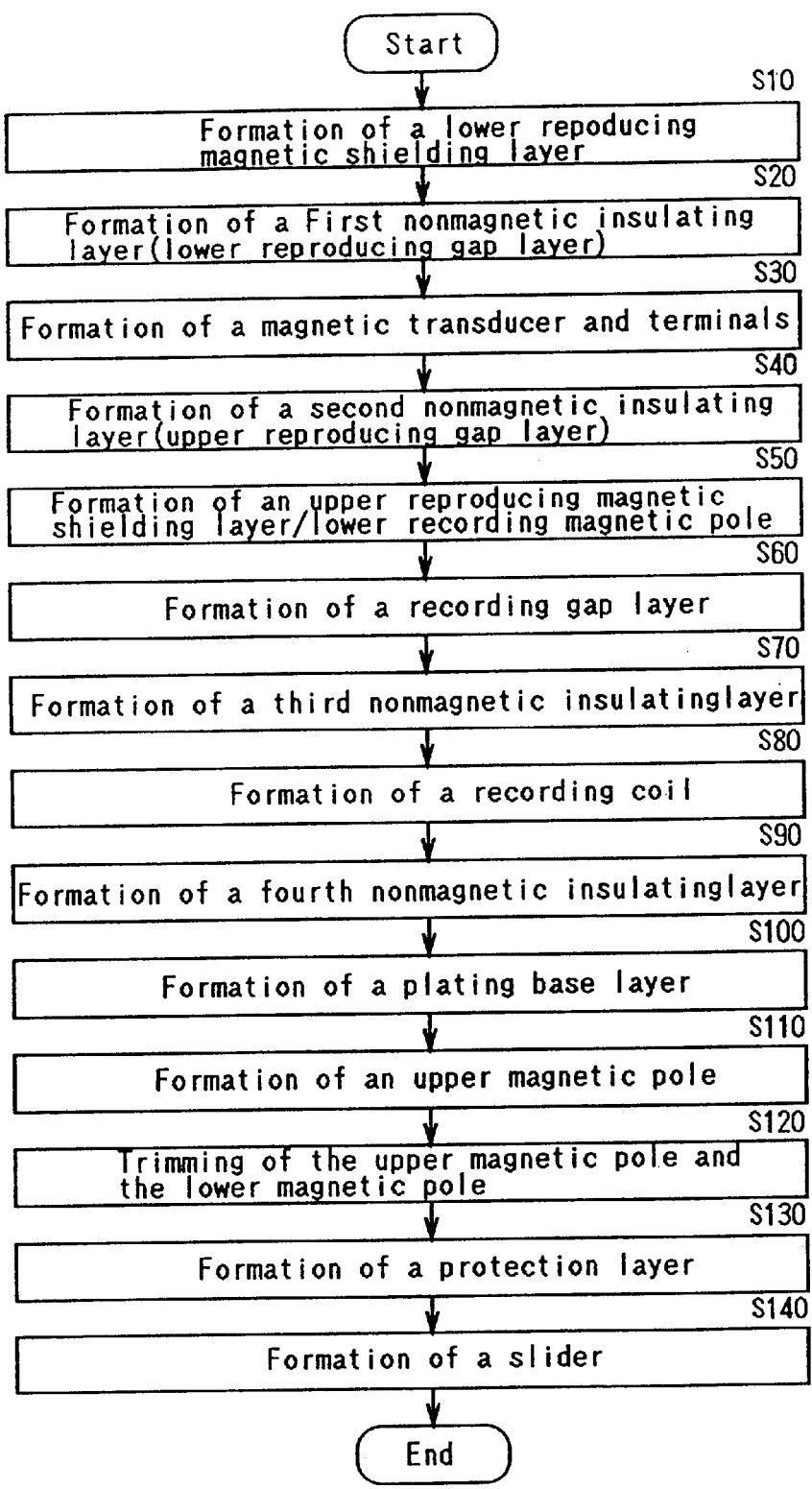
FIG. 5 is a flowchart illustrating steps to explain a method of manufacturing the composite magnetic head shown in FIG. 3.

FIG. 5 is a flowchart illustrating steps to explain the method of manufacturing the composite magnetic head shown in FIG. 3. FIGS. 6A to 6E are fragmental sectional views showing the ABS of the composite magnetic head in respective manufacturing steps in FIG. 5. FIGS. 7A to 7E are fragmental sectional views showing the Y-Z surface of the composite magnetic head passing through a center of the recording coil 12 in respective manufacturing steps in FIG. 5. The method of manufacturing the composite magnetic head shown in FIG. 3 will be explained along the flowchart in FIG. 5, while appropriately referring to sectional views shown in FIGS. 6A to 7F.

Figure 6A:
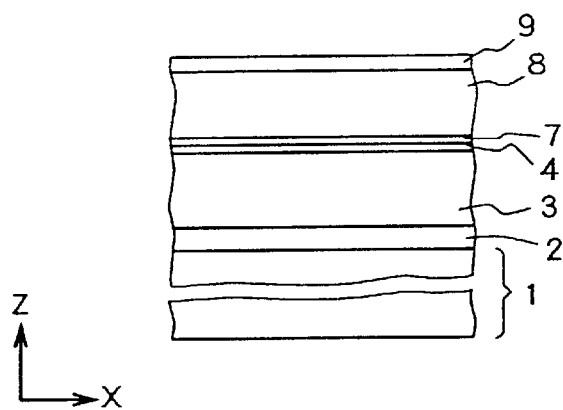
FIGS. 6A to 6F are fragmental sectional views showing a sectional shape of the composite magnetic head, taken along the line A—A in the FIG. 4B, in respective steps in FIG. 5.
Figure 7A:
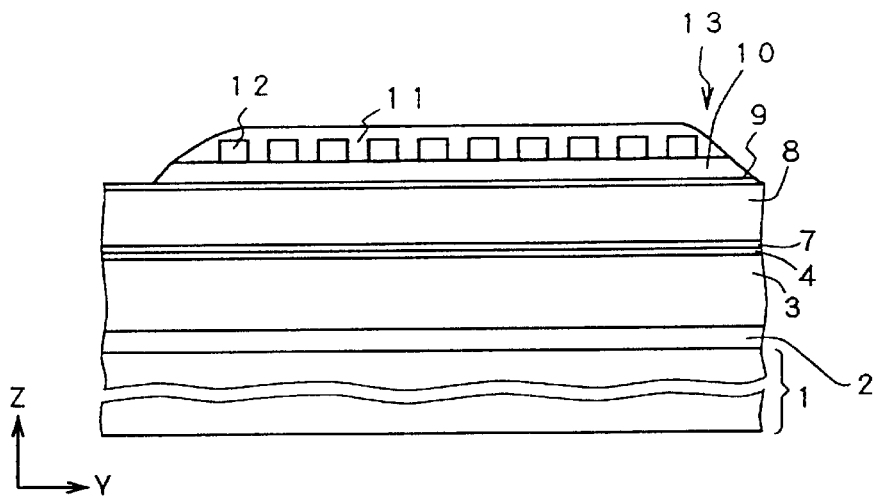
FIGS. 7A to 7F are fragmental sectional views showing a sectional shape of the composite magnetic head, taken along the line B—B in FIG. 4B, in respective steps in FIG. 5.

In step S10, the lower reproducing magnetic shielding layer 3 is formed. More particularly, as shown in FIG. 6A and FIG. 7A, the substrate 1 is prepared, then the substrate protection film 2 is formed on the substrate, and then the lower reproducing magnetic shielding layer 3 is formed on the substrate protection film.

In step S20, the first nonmagnetic insulating layer (lower reproducing gap layer) 4 is formed on the lower reproducing magnetic shielding layer 3.

In step S30, the magnetic transducer 5 and a pair of terminals 6a, 6b are formed. More particularly, an MR film, a GMR film, etc. are formed on the first nonmagnetic insulating layer 4 and then the magnetic transducer 5 is formed by patterning the films. Then, a pair of terminals 6a, 6b are formed on both side of the magnetic transducer 5 respectively.

In step S40, the second nonmagnetic insulating layer (upper reproducing gap layer) 7 is formed on the first nonmagnetic insulating layer 4 so as to cover the magnetic transducer 5 and a pair of terminals 6a, 6b.

In step S50, the upper reproducing magnetic shielding layer/lower recording magnetic pole 8 is formed on the second nonmagnetic insulating layer. The lower recording magnetic pole 8 is formed by the plating method or the sputtering method. If the lower recording magnetic pole 8 is formed by the plating method, Co alloy such as NiFe alloy, or CoNiFe, etc. may be employed, and first a plating base layer 14 is formed previously by sputter or evaporation and then the lower recording magnetic pole 8 is formed by the electroplating method to have a film thickness of about several $\mu$m. If the lower recording magnetic pole 8 is formed by the sputtering method, either Fe alloy such as FeN, FeNZr, etc. or Co alloy such as CoZr, etc. may be employed. In this case, the plating base layer is not needed.

In step S60, the recording gap layer 9 is formed on the lower recording magnetic pole 8. For example, the recording gap layer 9 may be formed of $Al_2O_3$, $SiO_2$, etc.

However, if a film such as $SiO_2$ which has a high etching rate, for example, is employed solely as the recording gap layer 9, sometimes reduction in film thickness of the recording gap layer 9 may be caused in the course of formation of the third nonmagnetic insulating layer (thermosetting (i.e. hard cured) layer of the resist), the recording coil, and the fourth nonmagnetic insulating layer (thermosetting (i.e. hard cured) layer of the resist) in post-steps. In order to avoid such reduction in film thickness of the recording gap layer 9, a gap protection layer 9a, if desired, may be provided on the recording gap layer 9.

Figure 8A:
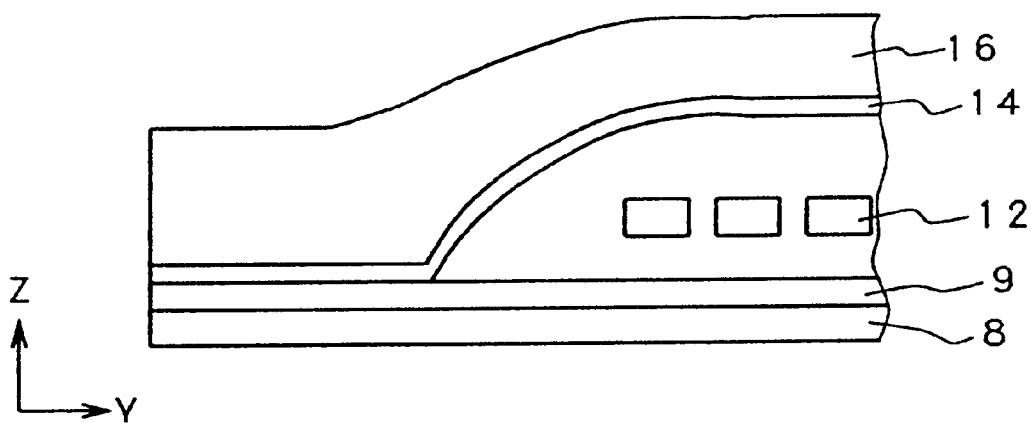
FIG. 8A is a view showing the magnetic head in which a gap protecting layer is not formed on a recording gap layer.
Figure 8B:
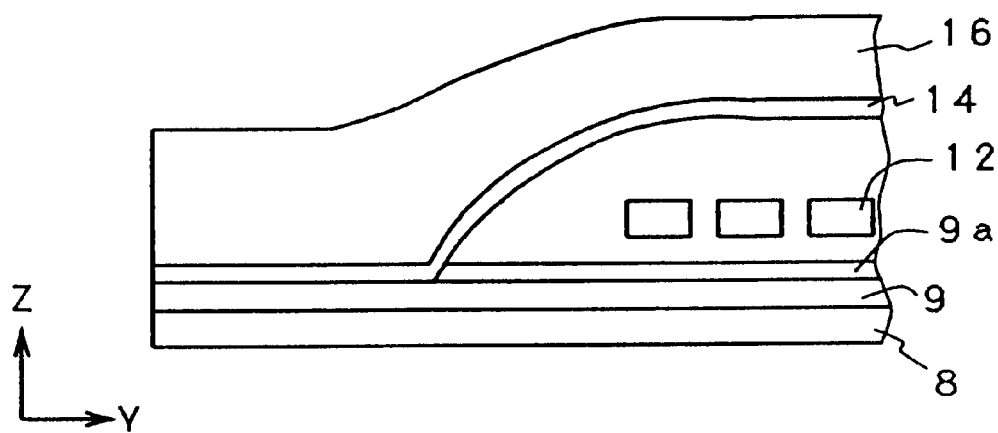
FIG. 8B is a view showing the magnetic head in which the gap protecting layer is formed on the recording gap layer.

FIG. 8A is a view showing the case where no gap protecting layer is formed on the recording gap layer 9. FIG. 8B is a view showing the case where the gap protecting layer 9a is formed on the recording gap layer 9. As shown in FIG. 8B, at first the $SiO_2$ film is formed as the recording gap layer 9 and then the gap protecting layer 9a such as $Al_2O_3$, SiN, AlN, etc., which has a relatively low etching rate, may be formed on the $SiO_2$ film. The gap protecting layer 9a can carry out a function to compensate the reduction in film thickness of the recording gap layer 9 in the course of formation of the third nonmagnetic insulating layer, the recording coil, and the fourth nonmagnetic insulating layer in post-steps. In case the gap protecting layer 9a is employed, it is removed prior to the formation of the plating base layer (step S100) in post-steps. The gap protecting layer 9a may be removed by chemical etching.

In step S70, the third nonmagnetic insulating layer 10 is formed on the recording gap layer 9 (or the gap protecting layer 9a). The third nonmagnetic insulating layer 10 can be formed, for example, by coating photosensitive liquid photoresist by using the spin coating, then patterning the photoresist to remove a portion of the. photoresist corresponding to a central area of the spiral coil 12, and then hardening the photoresist by heating (hard cure).

In step S80, the recording coil 12 is formed.

In step S90, the fourth nonmagnetic insulating layer 11 is formed on the third nonmagnetic insulating layer 10 to cover the recording coil 12. FIG. 6A and FIG. 7A show the shape of the composite magnetic head at this stage respectively. Like the third nonmagnetic insulating layer 10, this fourth nonmagnetic insulating layer 11 can be formed, for example, by coating photosensitive liquid photoresist by using the spin coating, then patterning the photoresist to remove a portion of the photoresist corresponding to a central area of the spiral coil 12, and then hardening the photoresist by heating (hard cure). In this manner, a hole or opening 13 which comes up to the lower recording magnetic pole 8 is formed in the central area of the spiral coil 12. In this case, such hole 13 can be formed at a time after the third nonmagnetic insulating layer 10 and the fourth nonmagnetic insulating layer 11 have been formed.

Figure 6B:
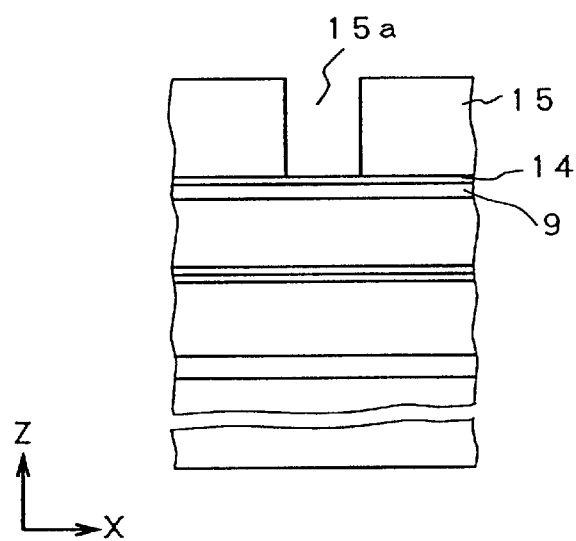
Figure 7B:
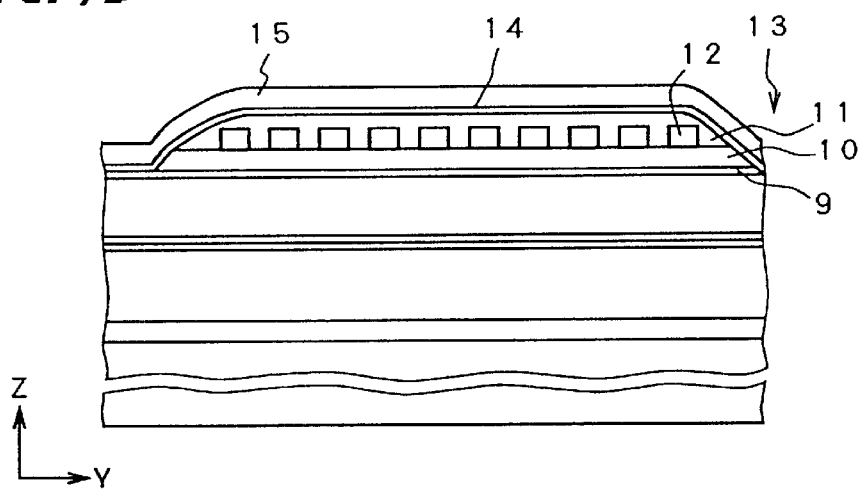

In step S100, the plating base layer 14 is formed, as shown in FIG. 6B and FIG. 7B. More particularly, the plating base layer 14 made of NiFe is formed thin on the fourth nonmagnetic insulating layer 11 and the recording gap layer 9 including an inner surface of the hole 13 by the sputtering method, the evaporation method, or the like.

In step S110, the upper magnetic pole 16 is formed. More particularly, a window 15a is formed in an upper magnetic pole forming area of photoresist 15 by coating the photoresist 15 on the plating base layer 14, and then exposing/developing the photoresist.

Prior to this photoresist coating, a reflection preventing film, if desired, may be formed on the plating base layer 14. The reflection preventing film will be explained in detail later in another section of this disclosure.

Figure 6C:
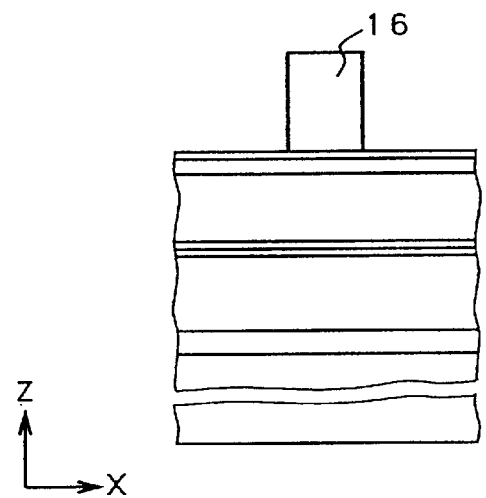
Figure 7C:
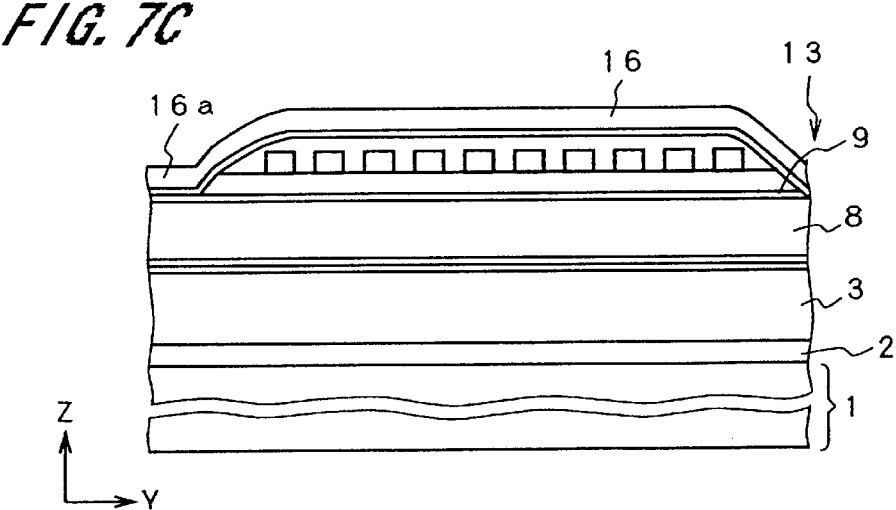

Then, as shown in FIG. 6C and FIG. 7C, the upper magnetic pole 16 made of NiFe is formed in the window 15a by the electroplating method to have a thickness of several $\mu$m. The upper magnetic pole 16 is tapered toward the magnetic recording medium 20 in the neighborhood of the magnetic recording medium 20 such that an elongated (i.e. long and narrow) pole 16a is formed in an area opposing to the magnetic recording medium 20. The upper magnetic pole 16 is shaped to be connected to the lower recording magnetic pole 8 via the hole 13 which is positioned in the central area of the spiral coil 12.

Figure 6D:
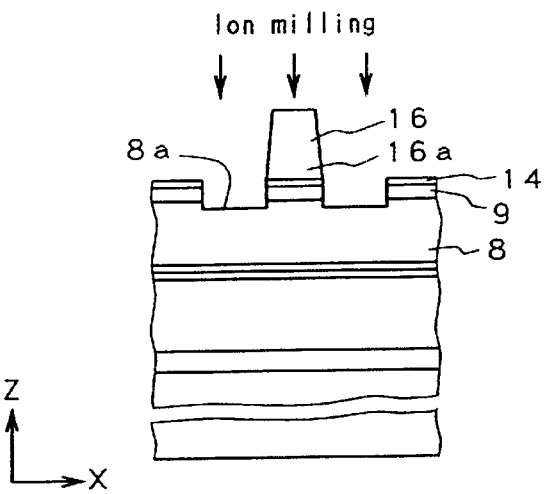
Figure 7D:
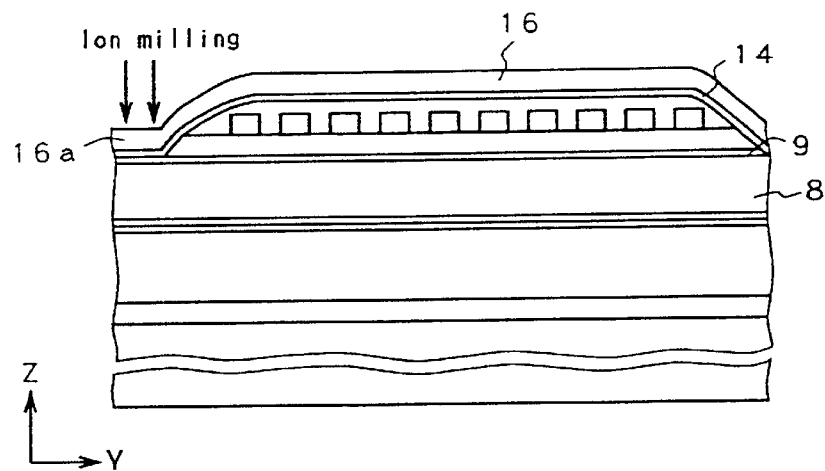

In step S120, as shown in FIG. 6D and FIG. 7D, the elongated pole 16a of the upper magnetic pole 16 and the upper portion of the lower recording magnetic pole 8 are trimmed partially by the ion milling method to be shaped into a predetermined shape. More particularly, prior to cutting away the substrate 1, both side portions of the elongated pole 16a which contact to the recording gap layer 9 in the upper magnetic pole 16 are trimmed by the ion milling method to be shaped into the predetermined shape. At the same time, the lower recording magnetic pole 8 which is positioned below the elongated pole 16a is partially trimmed to form predetermined grooves or concave portions 8a on the upper portion of the lower recording magnetic pole 8.

Figure 6E:
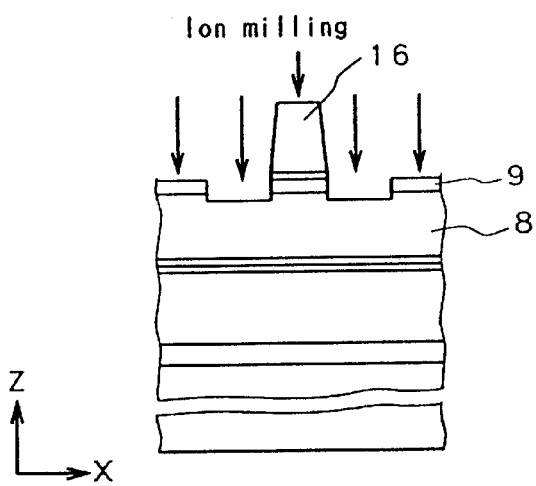
Figure 6F:
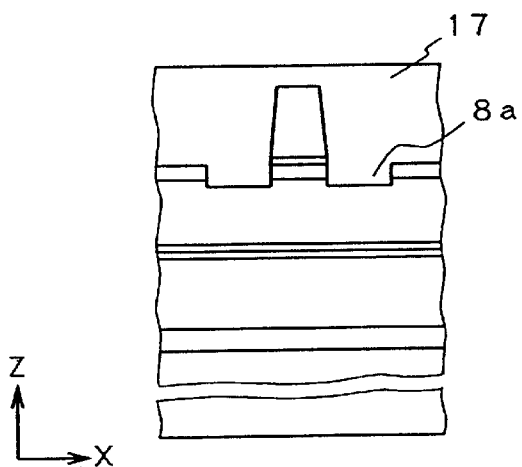
Figure 7E:
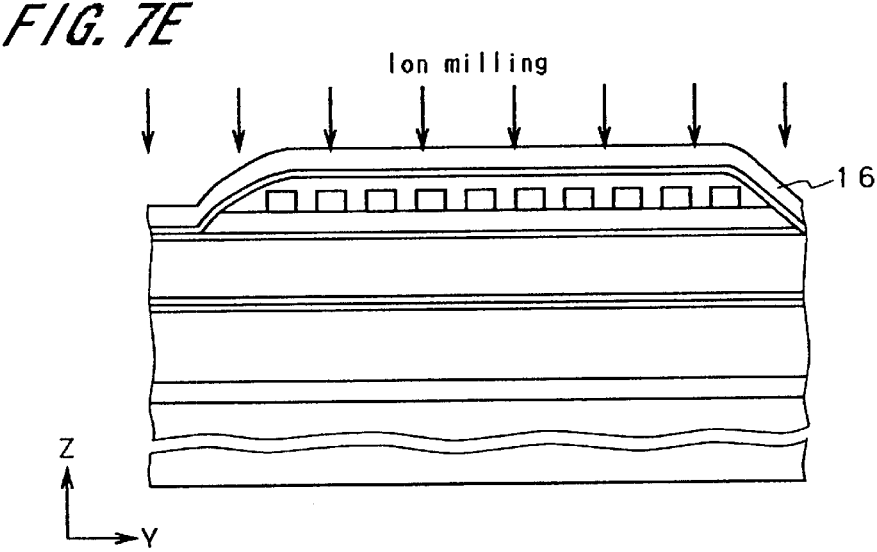
Figure 7F:
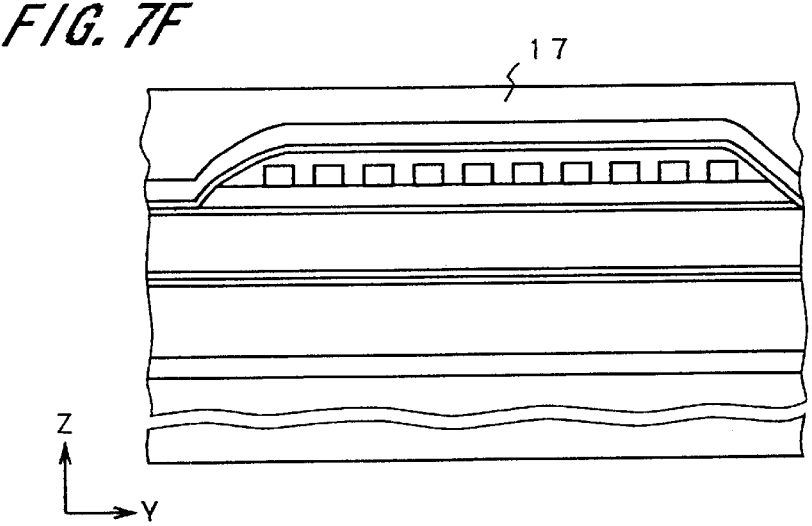

As shown in FIG. 6E and FIG. 7E, the plating base layer 14 exposed from areas other than the upper magnetic pole 16 is removed by the ion milling method after this trimming operation has been finished. At this time, the upper magnetic pole 16 is also reduced by a thickness corresponding to the plating base layer 14. However, because the plating base layer 14 and the upper magnetic pole 16 are formed of the same material, the upper magnetic pole 16 is restored substantially to its original thickness. After this, electrode pads (not shown) which are connected to both terminals of the transducer respectively, electrode pads (not shown) which are connected to both terminals of the recording coil respectively, etc. are formed.

This trimming process can be carried out at any time after formation of the upper magnetic pole 16 but before formation of the gap protection layer 9a. An operation time of the partial trimming process of the elongated pole 16a and the lower recording magnetic pole 8 can be considerably reduced rather than irradiation of the focused ion beam in the prior art. As a result, a manufacturing time of the magnetic head can be shortened and also a production cost of the magnetic head can be reduced. This is because the focused ion milling method in the prior art needs a focusing operation of the ion beam and also manufactures the magnetic head sequentially in unit of head, while the ion milling method employed in the present embodiment does not need the focusing operation and also can carry out the trimming process of about 10,000 magnetic heads being installed in one substrate at the same time.

A predetermined shape of the elongated pole 16a of the upper magnetic pole 16 and predetermined grooves or concave portions 8a of the lower recording magnetic pole 8 will be explained together in detail later.

In step S130, as shown in FIG. 6E and FIG. 7E, the protection layer 17 made of $Al_2O_3$, for example, is formed on a substantially entire surface of the upper magnetic pole 16. At this time, the grooves 8a of the lower recording magnetic pole 8 which are positioned on both sides of the elongated pole 16a are buried by the protection layer 17.

Figure 9A:
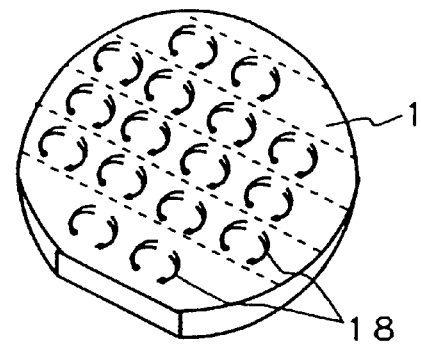
FIG. 9A is a view showing the situation in which a plurality of magnetic heads are formed on a wafer.
Figure 9B:
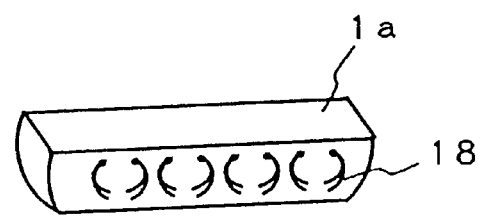
FIG. 9B is a view showing a rod-like wafer which is cut out from the wafer shown in FIG. 9A.
Figure 9C:
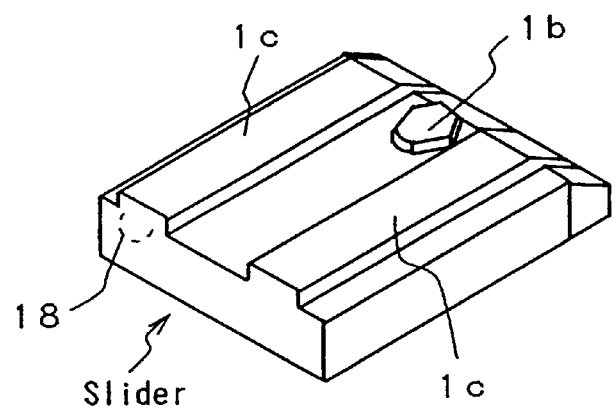
FIG. 9C is a view showing the situation in which a slider is manufactured from the rod-like wafer shown in FIG. 9B.

In step S140, the slider is formed by dividing the substrate 1. Before entering this process, the substrate 1 has not been divided and processed as a whole in respective steps. Therefore, as shown in FIG. 9A, a plurality of composite magnetic heads 18 are aligned in plural in a matrix fashion (e.g., about 10,000 pieces on a 5-inch wafer) on the wafer 1. Then, as shown in FIG. 9B, the substrate 1 is cut and divided into a plurality of rod-like wafers 1a. As shown in FIG. 9C, rail surfaces 1b, 1c are formed on the divided rod-like wafer 1a, and then the shape of the slider 19 can be finished by dividing the rod-like wafer 1a.

[Trimming of the Upper Magnetic Pole, etc.]

Figure 10A:
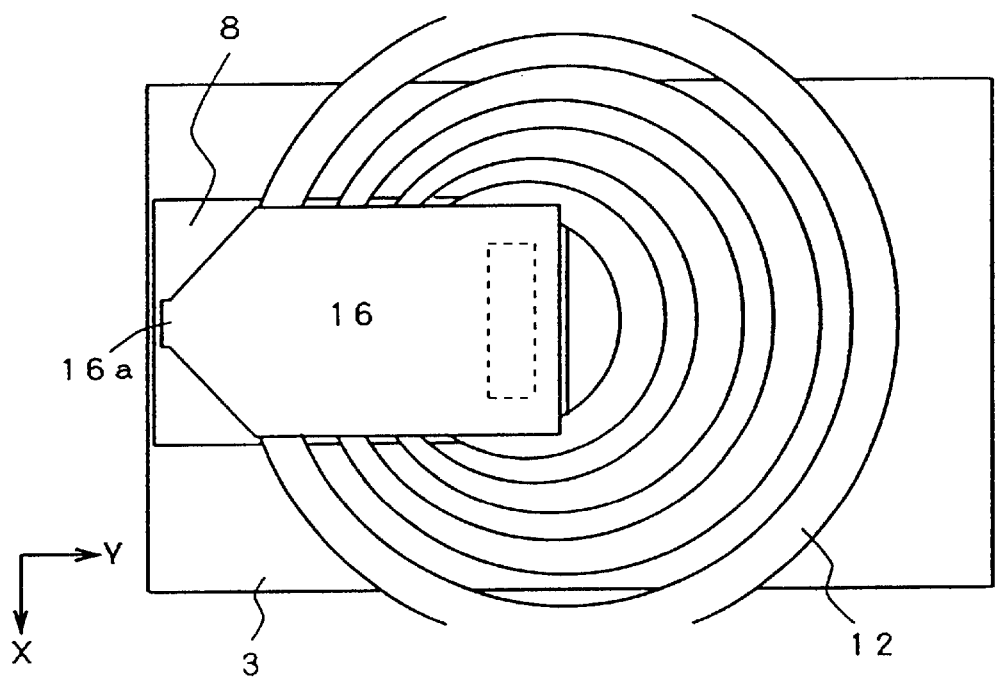
FIG. 10A is a view showing a planar structure of the magnetic head showing an upper magnetic pole and its neighboring members as trimming objects.
Figure 10B:
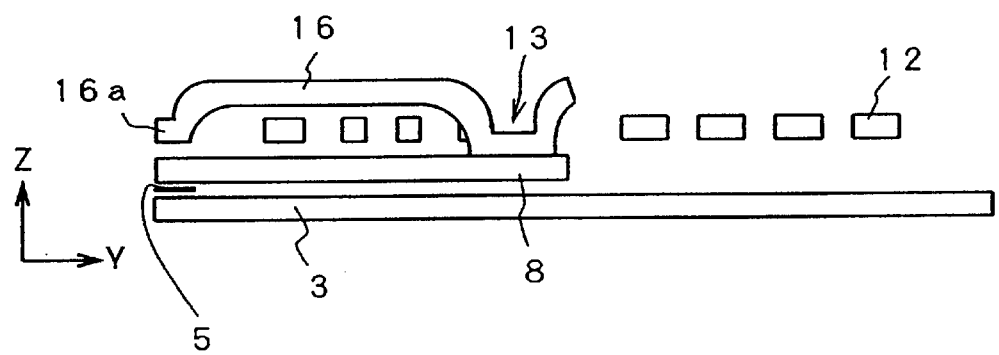
FIG. 10B is a view showing a laminated layer sectional structure of the magnetic head showing the upper magnetic pole and its neighboring members as trimming objects.

FIG. 10A is a view showing a planar structure of the magnetic head showing the upper magnetic pole 16 and its neighboring members as trimming objects. FIG. 10B is a view showing a laminated layer sectional structure of the magnetic head showing the upper magnetic pole 16 and its neighboring members as trimming objects. According to the first trimming method to be explained in the following, the trimming process is applied to the elongated pole 16a positioned on the leftmost side of the upper magnetic pole 16 and the upper portion of the lower recording magnetic pole 8 positioned around and below the elongated pole 16a. In the second trimming method, only the trimming process of the elongated pole 16a of the upper magnetic pole 16 is carried out, nevertheless the trimming process of the upper portion of the lower recording magnetic pole 8 is not carried out.

(First Trimming Method)

Figure 11A:
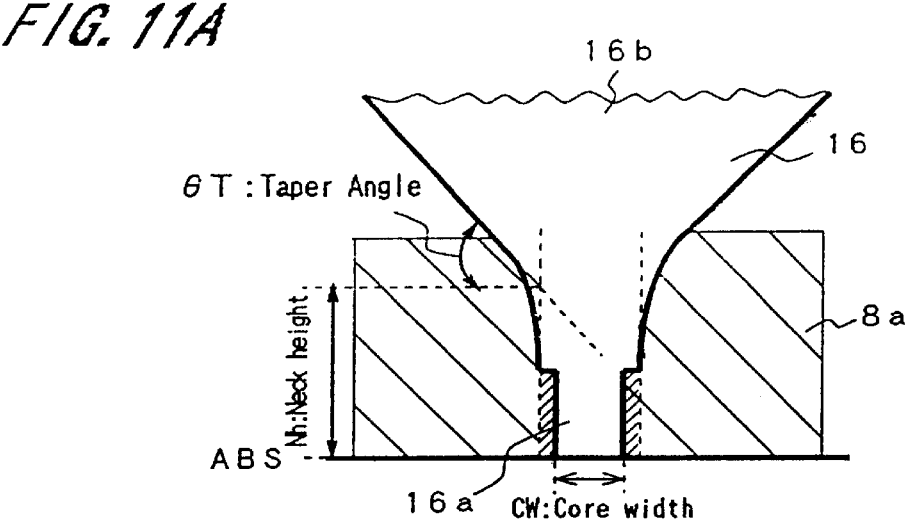
FIGS. 11A to 11C are views showing the upper magnetic pole and the lower magnetic pole trimmed by a first trimming method respectively.
Figure 11B:
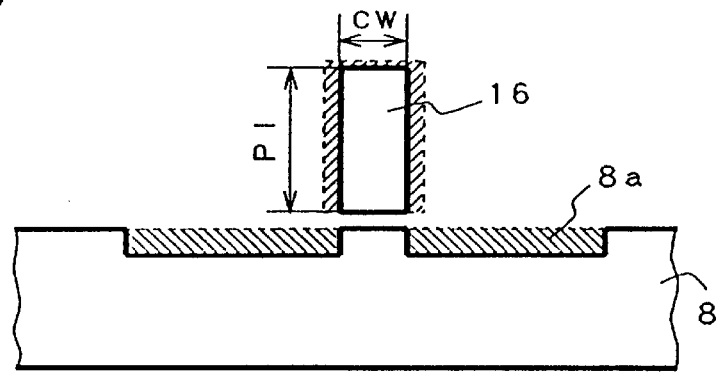
Figure 11C:
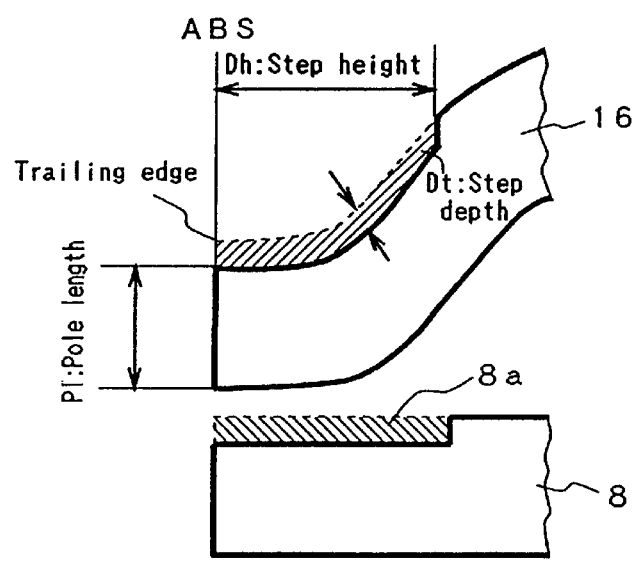

FIGS. 11A to 11C are views showing the upper magnetic pole 16 and the lower magnetic pole 8 trimmed by the first trimming method respectively. FIG. 11A is a plan view showing the upper magnetic pole 16 and the lower magnetic pole 8. FIG. 11B is a front view showing the ABS of them. FIG. 11C is a side view showing the upper magnetic pole 16 and the lower magnetic pole 8. Hatched portions in FIGS. 11A to 11C indicate deleted portions which are trimmed by the ion milling method respectively.

As shown in FIG. 11A, the upper magnetic pole 16 is shaped to form an elongated rod-like portion with a constant width (pole 16a) within a several μm range from the tip portion which faces the magnetic recording medium (not shown) and then a fan shaped or sectorial portion 16b which spreads out toward its end. In order to define the shape of the upper magnetic pole 16 after such trimming process of the upper magnetic pole 16 has been completed, in this disclosure, as shown in FIGS. 11A and 11B, the ABS longitudinal dimension and the film thickness dimension of the pole 16a are defined as "core width Cw" and the "pole length P1" respectively, and then, as shown in FIG. 11C, a length from a stepped portion of the upper magnetic pole 16 to the ABS (i.e., Y direction dimension of the trimming process) is defined as "step height Dh" and a depth of the step measured along the film thickness of the upper magnetic pole 16 is defined as "step depth Dt".

The inventors of the present invention have examined how the magnetic field intensity on the surface of the magnetic recording medium 20 is affected by the shape of the upper magnetic pole 16 which is subjected to the trimming process. Such examination has been carried out by the computer simulation which is based on three-dimensional magnetic field analysis software. The three-dimensional magnetic field analysis software is available from the market, e.g., "MAGIC" (software name) commercially available from the Elf Corporation located in Osaka, Japan.

Figure 12:
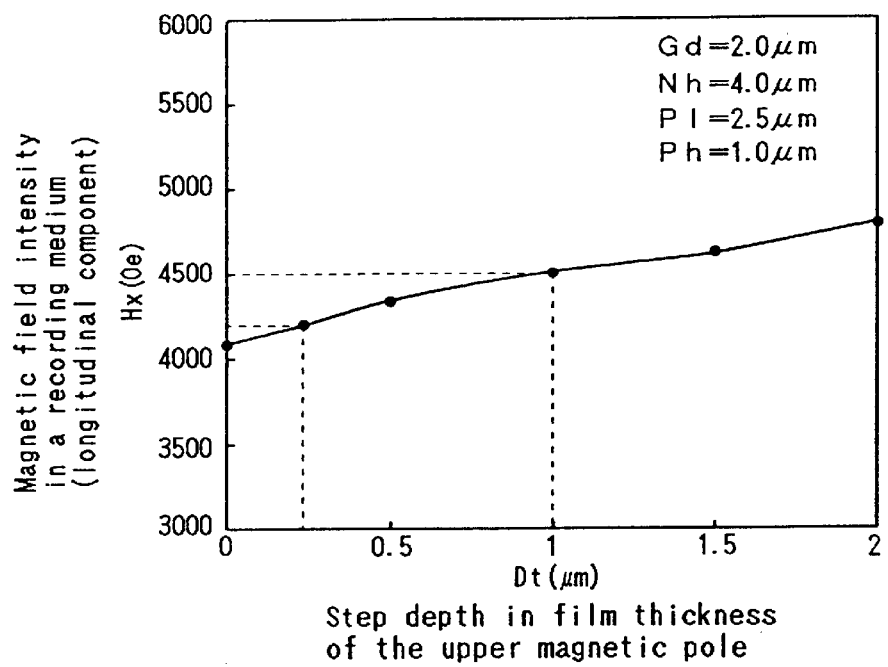
FIG. 12 is a graph showing Hx (longitudinal component of magnetic field intensity in a recording medium 20) relative to Dt (step depth of a concave portion of the upper magnetic pole in the film thickness direction) in the magnetic head being trimmed in FIGS. 11A to 11C.

FIG. 12 is a graph showing Hx (longitudinal component of the magnetic field intensity in the recording medium 20) relative to Dt (step depth) in the magnetic head which is subjected to the trimming process explained in FIGS. 11A to 11C. Conditions for the examination sample are Gd (recording gap length)=2.0 μm, Nh (neck height)=4.0 μm, P1 (pole length)=2.5 μm, and Dh (step height)=1.0 μm. As evident from FIG. 12, it can be understood that, if the magnetic head of the present invention is compared with the conventional magnetic head without the groove (step depth Dt=0), the magnetic field intensity Hx becomes high much more as the step depth Dt becomes deeper. The magnetic field intensity Hx is increased to exceed 4% if the step depth Dt is more than 0.25 μm. Especially, the magnetic field intensity Hx is increased to exceed 10% if the step depth Dt is more than 1.0 μm. Therefore, the production tolerance can be set large as a design specification if the magnetic field intensity Hx is increased more and more.

As the result of the examination in FIG. 12, the step depth Dt≧0.25 μm, preferably Dt≧1.0 μm in the grooves formed on the upper magnetic pole 16.

Figure 13:
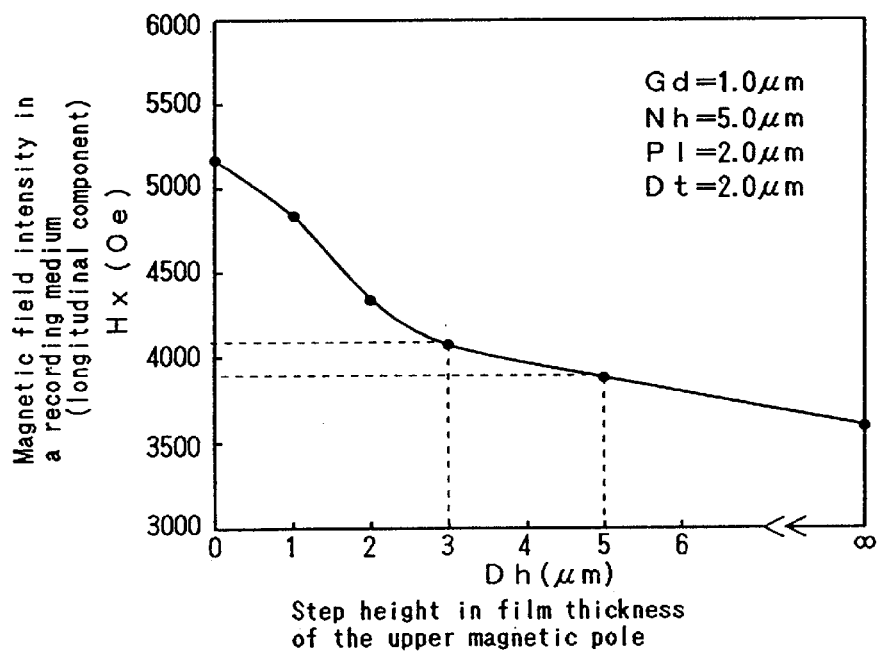
FIG. 13 is a graph showing Hx (longitudinal component of the magnetic field intensity in the recording medium 20) relative to P1 (pole length of the upper magnetic pole) in the magnetic head being trimmed in FIGS. 11A to 11C.

FIG. 13 is a graph showing Hx (longitudinal component of the magnetic field intensity in the recording medium 20) relative to P1 (pole length) in the magnetic head which is trimmed and explained in FIGS. 11A to 11C. Conditions for the examination sample are Gd (recording gap length)=1.0 μm, Nh (neck height)=5.0 μm, P1 (pole length)=2.0 μm, and the step height decided from FIG. 11C Dh=2.0 μm. As evident from FIG. 13, it can be understood that, if the magnetic head of the present invention is compared with the conventional magnetic head without the groove (step height Dh=∞), the magnetic field intensity Hx is increased much more as the step height Dh becomes lower. The magnetic field intensity Hx is increased to exceed 8% if the step height Dh is at least less than 5 μm. Especially, the magnetic field intensity Hx is increased to exceed 14% if the step height Dh is at least less than 3 μm. Therefore, the production tolerance can be set large as a design specification if the magnetic field intensity Hx is increased more and more.

As the result of the examination in FIG. 13, the step height Dh≦5.0 μm, preferably Dh≦3.0 μm in the grooves formed on the upper magnetic pole 16.

Figure 14:
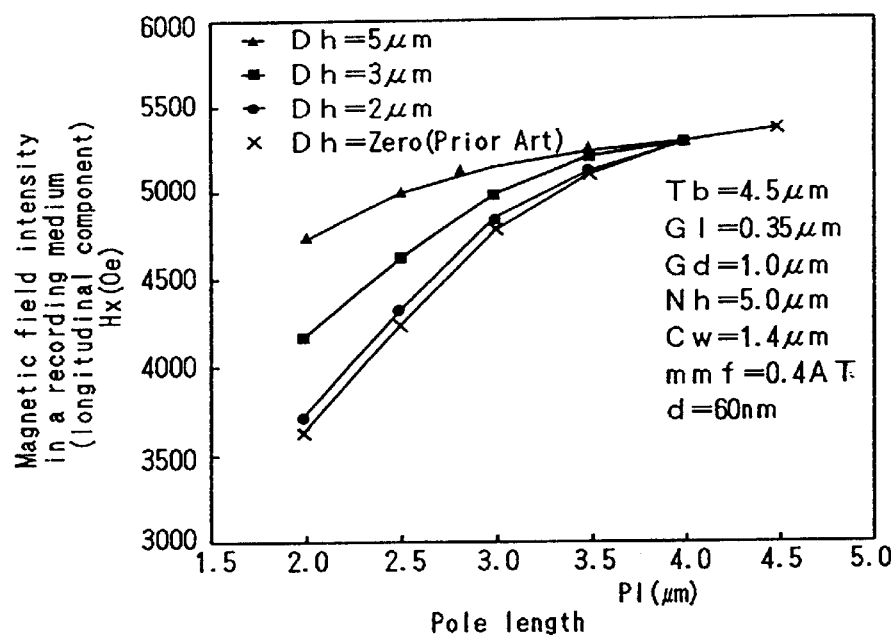
FIG. 14 is a graph showing Hx (longitudinal component of the magnetic field intensity in the recording medium 20) relative to P1 (pole length of the upper magnetic pole), using Dh (step height of the concave portion of the upper magnetic pole in the film thickness direction) as a parameter, in the magnetic head being trimmed in FIGS. 11A to 11C.

FIG. 14 is a graph showing Hx (longitudinal component of the magnetic field intensity in the recording medium 20) relative to P1 (pole length), using Dh (step height) as a parameter, in the magnetic head which is subjected to the trimming process explained in FIGS. 11A to 11C. Conditions for the examination sample are Tb (film thickness of the upper magnetic pole 16 except for the tip portion)=4.5 μm, G1 (gap length)=0.35 μm, Gd (recording gap length)= 1.0 μm, Nh (neck height)=5.0 μm, Cw (core width)=1.4 μm, mmf (magnetomotive force)=0.4 AT, and d (spacing between the recording medium 20 and the magnetic head)= 60 nm.

In the conventional magnetic head without the groove (step height Dh=0), the magnetic field intensity Hx is abruptly attenuated as the pole length is decreased. By way of example, assume that a dimensional center value of the pole length and a production tolerance are set to 3.0 μm and ±0.5 μm respectively, Hx=4700 Oe at P1=3.0 μm, Hx=4250 Oe at P1=2.5 μm, and Hx=5150 Oe at P1=3.5 μm. Thus, the magnetic field intensity Hx is changed over almost 1000 Oe between an upper limit and a lower limit of the production tolerance. Recording performances such as the overwrite characteristic are deteriorated extremely if the magnetic field intensity Hx is insufficient, while the side fringing of recording is enhanced in the core width Cw direction to thus cause the trouble of high density of the magnetic recording medium 20 if the magnetic field intensity Hx is excessively strong. Therefore. it is needed that variation of the magnetic field intensity Hx with respect to the dimensional tolerance in manufacturing should be made small. Particularly, the maximum problem is that, when the pole length becomes small, the magnetic field intensity Hx is reduced and the overwrite characteristic is degraded. As a result, in order to suppress the variation of the magnetic field within ±300 Oe at the center value of the pole length P1=3 μm, the production tolerance of the pole length should be set less than ±0.3 μm.

As evident from FIG. 14, it can be understood in the present embodiment that the dependency of the magnetic field intensity Hx upon the pole length is made relatively small by providing the grooves on the upper magnetic pole. More specifically, if the step height is in excess of Dh=3 μm, the production tolerance of the pole length up to ±0.5 μm is allowed in order to achieve the variation of the magnetic field of less than ±300 Oe.

Similarly, if the step height Dh=5 μm, the production tolerance of the pole length can be extended up to less than ±0.8 μm in order to achieve the variation of the magnetic field of less than ±300 Oe. At that time, if the pole length is set relatively long, e.g., P1≧2.5 μm, the magnetic field intensity Hx of more than about 4600 Oe can be obtained. This value of the magnetic field intensity Hx is almost twice that of the recording medium 20 which has been confirmed recently. If the pole length is set like P1≧3.0 μm, the magnetic field intensity Hx of more than about 5000 Oe can be obtained.

Figure 15:
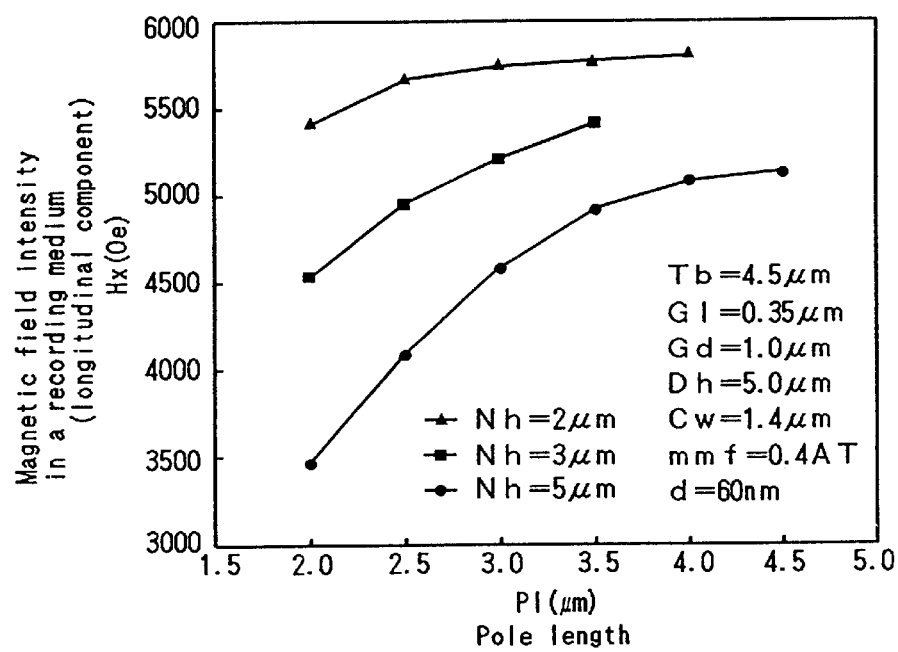
FIG. 15 is a graph showing Hx (longitudinal component of the magnetic field intensity in the recording medium 20) relative to P1 (pole length of the upper magnetic pole), using Nh (neck height of the upper magnetic pole) as a parameter, in the magnetic head being trimmed in FIGS. 11A to 11C.

FIG. 15 is a graph showing Hx (longitudinal component of the magnetic field intensity in the recording medium 20) relative to P1 (pole length), using Nh (neck height) as a parameter, in the magnetic head which is subjected to the trimming process explained in FIGS. 11A to 11C.

Conditions for the examination sample are Tb (film thickness of the upper magnetic pole 16 except for the tip portion)=4.5 μm, G1 (gap length)=0.35 μm, Gd (recording gap length)=1.0 μm, Dh (step height)=5.0 μm, Cw (core width)=1.4 μm, mmf (magnetomotive force)=0.4 AT, and d (spacing between the recording medium 20 and the magnetic head)=60 nm. As evident from FIG. 15, it can be found that dependency of the magnetic field intensity Hx on the pole length P1 is decreased as the neck height Nh becomes smaller.

More particularly, if the neck height is set as Nh=5.0 μm, the dependency of the magnetic field intensity Hx on the pole length is heavy. If the neck height is set as Nh≦3.0 μm, the dependency of the magnetic field intensity Hx on the pole length can be reduced relatively, so that the variation in the magnetic field can be suppressed within less than 1500 Oe over the wide range of the pole length such as P1≧2.5 μm. In addition, if the neck height is set as Nh≦2.0 μm, the variation in the magnetic field can be suppressed within less than ±200 Oe over the wide range of the pole length such as P1≧2.0 μm.

Moreover, if the pole length is defined as P1≧2.5 μm when the neck height is set as Nh≦3.0 μm, the magnetic field intensity Hx of more than about 5000 Oe can be obtained. This magnetic field intensity Hx is almost twice that of the recording medium which has been confirmed recently. Besides, if the pole length is set as P1≧3.0 μm, the magnetic field intensity Hx exceeds about 5500 Oe. Even in the case that the storing medium which needs the higher magnetic field intensity is developed in the future, the fully satisfactory magnetic field intensity can be obtained.

(Trimming Operation)

Figure 16:
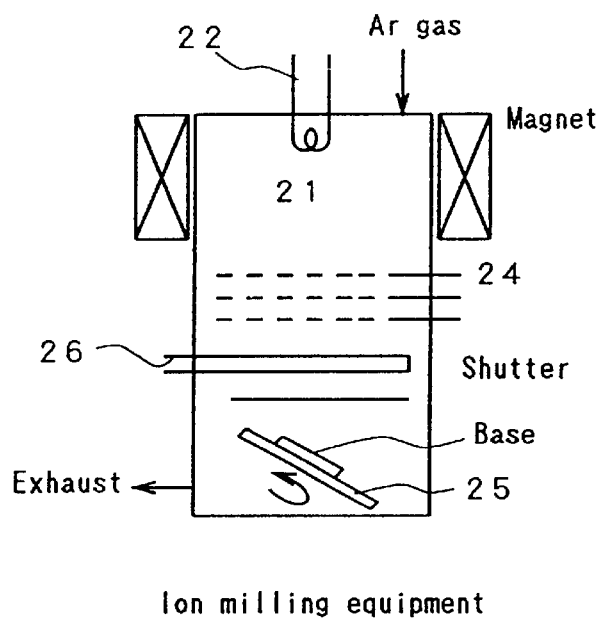
FIG. 16 is a schematic view showing an ion milling (ion etching) equipment.

FIG. 16 is a schematic view showing an ion milling (ion etching) equipment. The principle of the ion milling method is that etching is carried out by the physical reaction by using ion particles. More particularly, a heavy inert gas such as Ar, for example, which is introduced into the plasma chamber 21 is heated by the filament 22 and simultaneously the AC magnetic field is applied to the inert gas by the magnet 23, so that the inert gas is ionized. Then, ionized Ar particles are accelerated by the electric field being formed by the grid 24 toward the substrate (magnetic head) 1 on the sample table 25. Then, such ionized Ar particles being accelerated are neutralized when they pass through the neutralization filament 26. Then, such neutralized Ar particles collide with the upper and lower magnetic poles of the magnetic head being exposed from the resist to thus etch them physically.

In etching operation, the sample table 25 can rotate upon its center axis like a turn table, and therefore a uniform etching process can be attained. In addition, since the sample table 25 can be set at any desired angle relative to the flying direction of the Ar particles, an incident angle θi of the Ar particles to the sample (etched object) 1 can be controlled.

Figure 17:
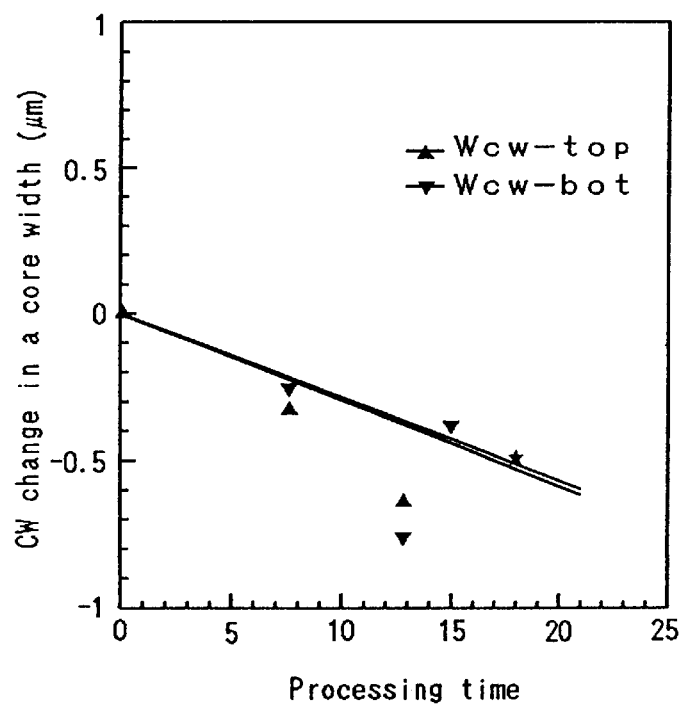
FIG. 17 is a graph showing a core width of the upper magnetic pole relative to a processing time, in ion milling steps using the ion milling equipment shown in FIG. 16.

FIG. 17 is a graph showing change in a core width Cw of the upper magnetic pole 16 relative to a processing time when the ion milling process is carried out by using the ion milling equipment shown in FIG. 16. Where "Wcw-top" denotes a core width measured at the upper bottom of the sectional shape of the upper magnetic pole 16 of the magnetic head, and "Wcw-bot" denotes a core width measured, at the lower bottom of the sectional shape of the upper magnetic pole 16. Both data substantially coincide with each other. It can be understood from a gradient of the data that the core width is etched and reduced at a rate of about 0.031 μm per minute. In this way, since an etching rate of the core width is sufficiently small in the ion milling process, a reduction rate of the core width can be controlled easily according to the processing time.

Figure 18:
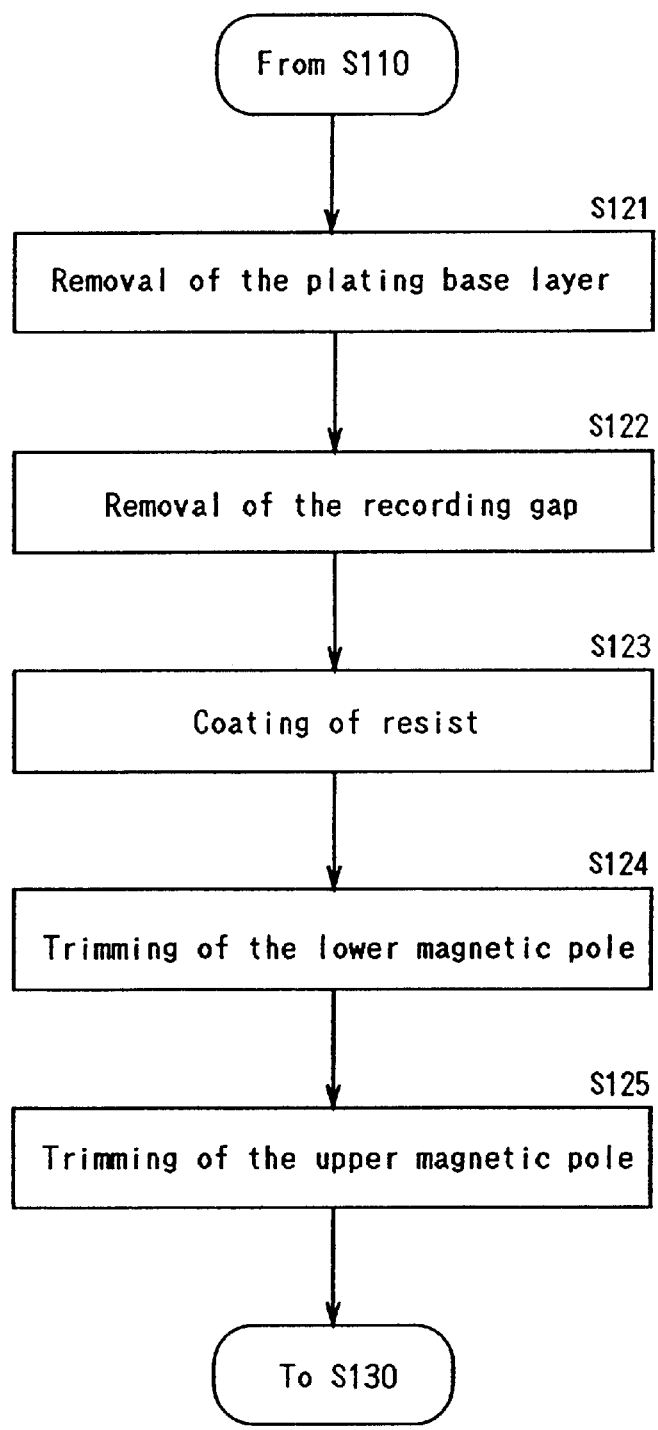
FIG. 18 is a flowchart illustrating a trimming operation of the upper magnetic pole and the lower magnetic pole.

FIG. 18 is a flowchart illustrating a trimming operation of the upper magnetic pole 16 and the lower magnetic pole 8. The trimming operation in FIG. 18 is a flow showing concretely the contents of the operation in step 120 in FIG. 5. Referring to FIG. 18, explanation will be made.

In step S121, the plating base layer 14 is removed. More particularly, after the upper magnetic pole 16 is formed, the plating base layer 14 is removed by the ion milling method. In this removal, the plating base layer 14 is removed firmly up to the edge of the side wall of the upper magnetic pole 16.

In step S122, the recording gap 9 on a trimming objective area of the lower magnetic pole 8 is removed. It is preferable that the recording gap 9 should be removed by the reactive ion etching (RIE) method by using the upper magnetic pole 16 as a mask. This is because, if the recording gap 9 is removed by the ion milling method, sometimes the amount of reduction in film thickness of the upper magnetic pole 16 is increased to thus yield reduction of the recording capability. Because of the operation of the reactive gas and the sputtering operation, the reactive ion etching method can control a selective ratio and execute anisotropic etching. Therefore, such reactive ion etching method is excellent as the fine pattern etching technology.

It is preferable that, even if the reactive ion etching method is employed, the process gas whose selectivity mates with the insulating layer between the resist layers should be used. Hence, it is preferable that, when the recording gap 9 is formed of $Al_2O_3$, the chlorine system process gas such as $CCl_4$, $Cl_2$, $BCl_3$, etc. should be employed as the reactive gas. In contrast, it is preferable that, when the recording gap 9 is formed of $SiO_2$, the fluorine system process gas such as $CF_4$, $CHF_3$, $C_3F_8$, $C_2F_6$, etc. should be employed as the reactive gas.

Figure 19A:
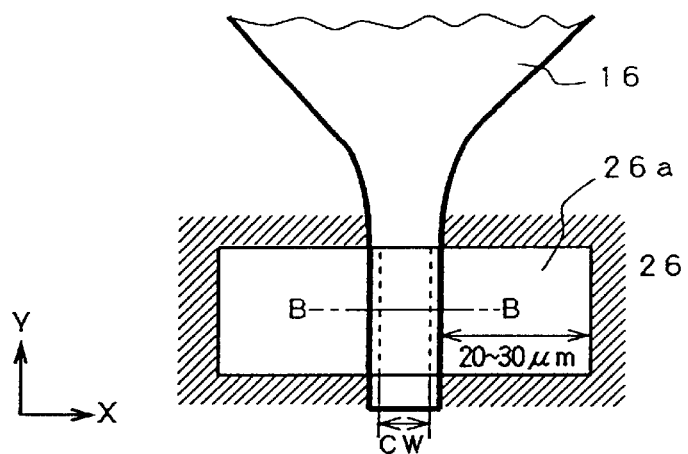
FIGS. 19A to 19C are views showing the upper magnetic pole and the lower magnetic pole in the trimming operation in FIG. 20.
Figure 19B:
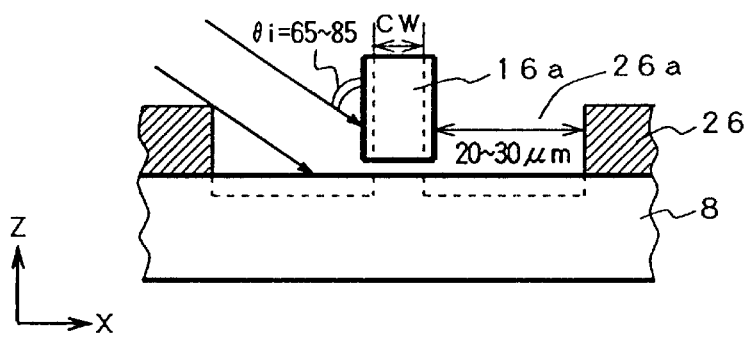
Figure 19C:
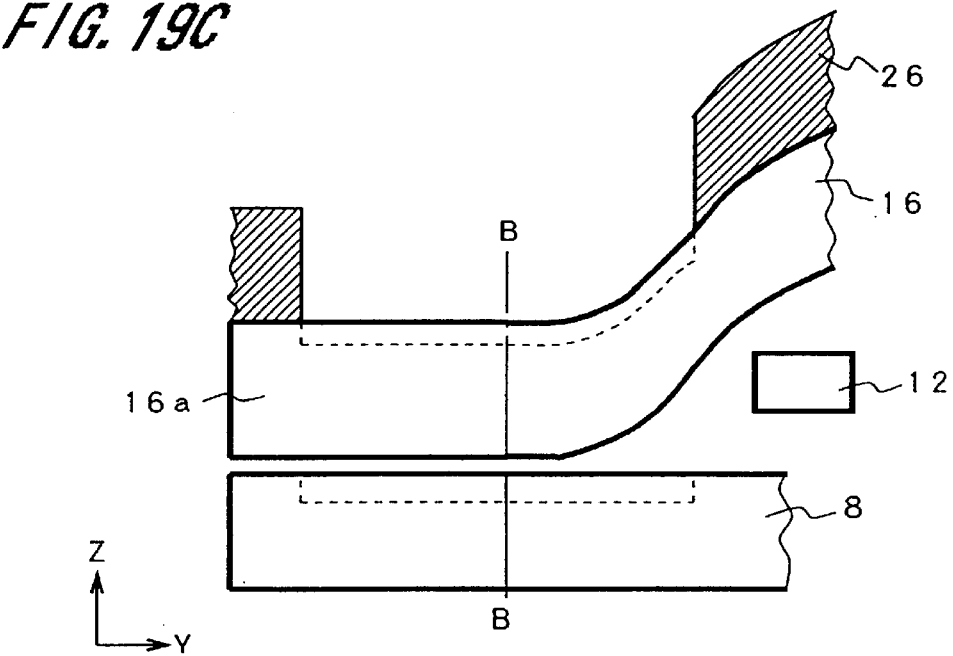

In step S123, as shown in FIGS. 19A through 19C, the resist 26 is coated except for the objective area of the trimming process. More particularly, damage of the magnetic poles except the trimming objective areas, caused in the reactive ion etching and the ion milling as the post steps can be reduced by protecting the whole surface other than a tip portion of the upper magnetic pole 16 and a part of the lower magnetic pole 8, which are objects of the trimming process, by the resist film, etc. In FIG. 19C, a line B—B is a finished cut line.

If a capping layer 32, if desired it, may be deposited on the surface of the upper magnetic pole 16, and reduction in film thickness of the upper magnetic pole 16 can be further avoided without fail in the trimming process of the lower magnetic pole 8 (step S124) and the trimming process of the upper magnetic pole 16 (step S125) in the post-steps.

Figure 21A:
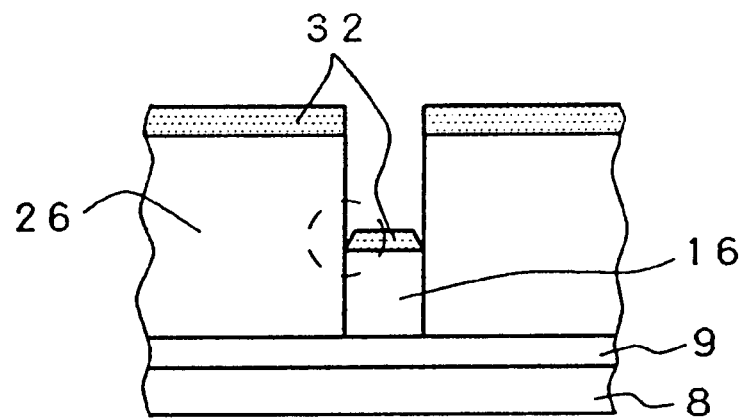
FIG. 21A is a sectional view showing the case where a capping layer is provided.
Figure 21B:
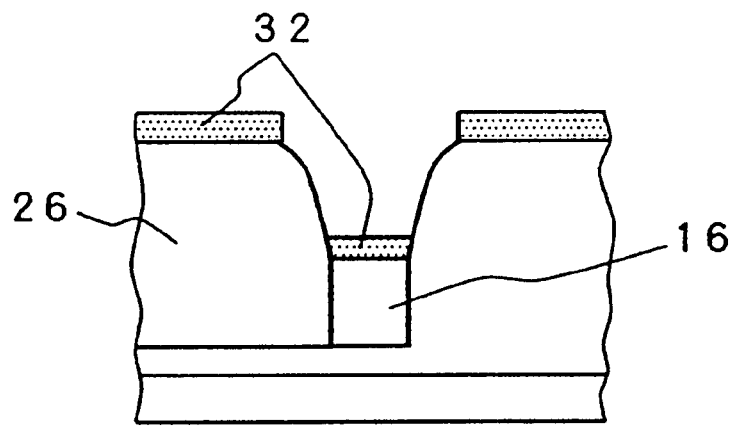
FIG. 21B is a sectional view showing the case where a capping layer is provided after heating.

More particularly, as shown in FIG. 21A, after the resist 26 is coated, a nonmagnetic layer such as $Al_2O_3$, Ti, etc. of about 0.2 to 0.4 μm thickness is formed on the resist 26 and the upper magnetic pole 16 as the capping layer 32 by the sputtering method. Because of the presence of the capping layer 32, reduction in film thickness of the upper magnetic pole 16 can be avoided in the reactive ion etching and the ion milling as the post-steps.

In addition, as the case may be, prior to formation of the capping layer 32, contraction of the resist 26 can be caused by heating the resultant structure at a temperature of 110° C., for example, to thus expand a resist opening 26a. If the capping layer 32 is formed on the upper magnetic pole 16 in the expanded opening 26a, the capping layer 32 can be formed uniformly on the overall surface of the upper magnetic pole 16, especially on edge portions (see a broken line circle in FIG. 23A) of the surface.

In step S124, the trimming process of the lower magnetic pole 8 is carried out. This trimming process is done by the ion milling method. It is preferable that an incident angle of the ion particles should be controlled within a range of θi=20 to 40 degree. At this time, adhesion material to the upper magnetic pole 16, etc. can also be removed.

In step S125, subsequently the trimming process of the upper magnetic pole 16 is carried out. This trimming process is also done by the ion milling method. It is preferable that, as shown in FIG. 19B, the incident angle of the ion particles should be controlled within a range of $\theta i=65$ to 85 degree. The core width Cw can be adjusted by this trimming process.

FIGS. 19A to 19C are views showing the upper magnetic pole 16 and the lower magnetic pole 8 in the trimming operation in step S125 in FIG. 18. If the incident angle of the Ar particles is kept within the range of $\theta i=65$ to 85 degree, the film thickness of the pole is not so reduced.

If a dimension of the opening 26a of the resist 26 along the core width direction is too small, the opening 26a disturbs the Ar particles being irradiated at within the angle range of $\theta i=65$ to 85 degree, to thus generate such a phenomenon that the Ar particles cannot comes up to the pole 16a. In order to avoid such phenomenon, as shown in FIGS. 19A and 19B, the dimension of the opening 26a of the resist 26 along the core width direction must be ensured within a range of 20 to 30 μm from the edge portion of the pole 16a.

Also, the trimming process of the lower magnetic pole 8 in step S124 and the trimming process of the upper magnetic pole 16 in step S125 can be reversed in order of the step. That is, first step S125 is carried out and then step S124 may be carried out.

(Second Trimming Method)

Figure 20A:
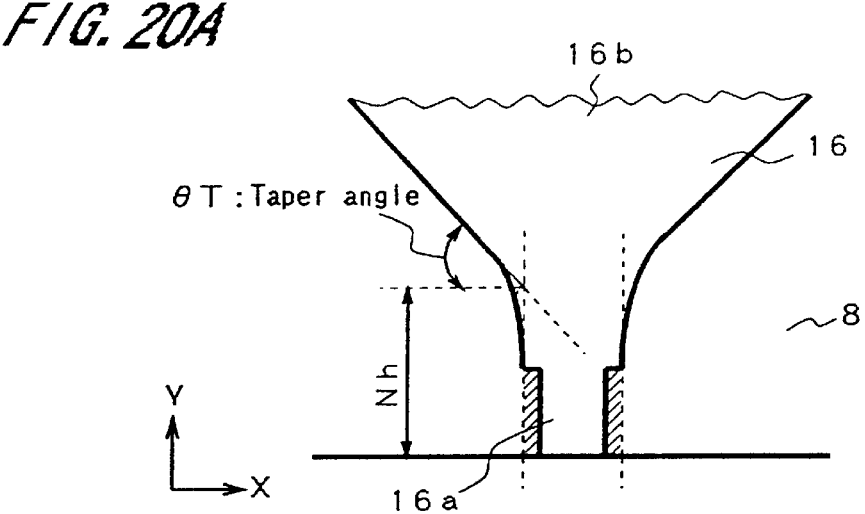
FIGS. 20A to 20C are views showing the upper magnetic pole and the lower magnetic pole which are trimmed by a second trimming method.
Figure 20B:
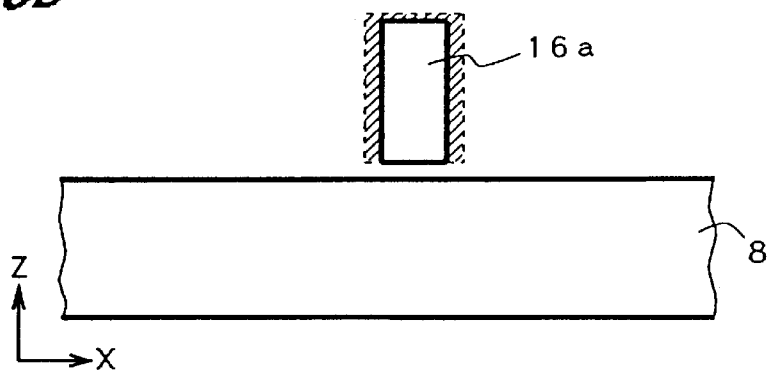
Figure 20C:
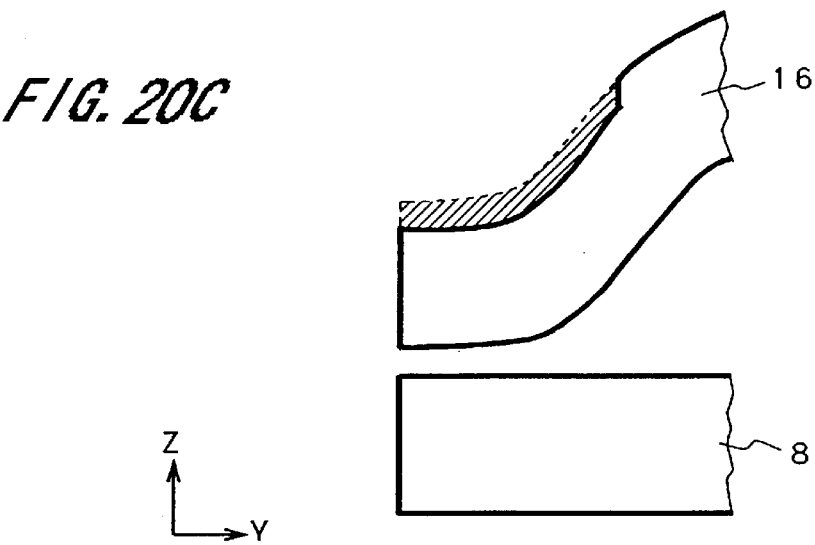

FIGS. 20A to 20C are views showing the upper magnetic pole 16 and the lower magnetic pole 8 which are trimmed by a second trimming method. FIG. 20A is a plan view showing the upper magnetic pole 16 and the lower magnetic pole 8, FIG. 20B is a front view showing the ABS of them, and FIG. 20C is a side view showing the upper magnetic pole 16 and the lower magnetic pole 8. Hatched portions show deleted portions which are subjected to the trimming process by the ion trimming method. In contrast to the first trimming method which has been explained with reference to FIGS. 11A through 11C and FIGS. 19A through 19C, the trimming process is not applied to the lower magnetic pole 8, but it is applied to only the upper magnetic pole 16. The shape of the trimmed upper magnetic pole 16 is identical to that trimmed by the first trimming method which has been explained in connection with FIGS. 11A through 11C.

In case only the upper magnetic pole 16 is shaped by the second trimming method, the magnetic field is spread wider than the first trimming method in which both the trimmed upper magnetic pole 16 and the lower magnetic pole 8 are subjected to the trimming process. However, if the magnetic disk drive has almost the existing recording density, even the magnetic head manufactured by the second trimming method can stand the practical use sufficiently.

[Reflection Preventing Film]

In connection with steps of forming the upper magnetic pole 16 explained in step S110 shown in FIG. 5, problems are pointed out in the following.

Figure 22A:
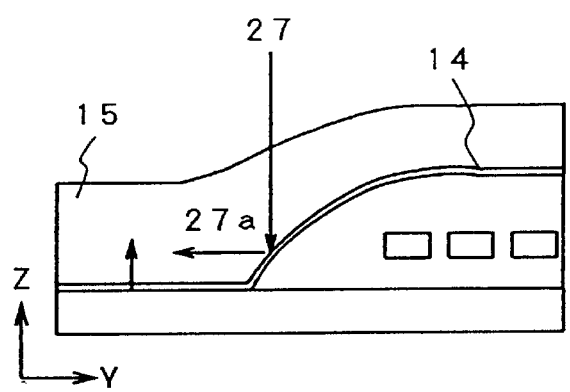
FIGS. 22A to 22D are views showing a harmful influence of a reflected light upon exposure of photoresist.
Figure 22B:
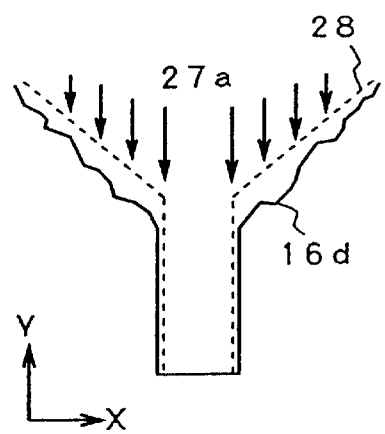

(1) In the step of patterning the photoresist 15 to form the upper magnetic pole 16, as shown in FIG. 22A, a reflected light 27a is generated from the taper portion or the underlying portion of the plating base layer 14 in exposure. Therefore, as shown in FIG. 22B, such a phenomenon is caused that not only a mask shape 28 is exposed by the exposure light 27 from the light source, but also the peripheral area of the mask shape 28 is exposed by the reflected light. Because of such phenomenon, an actually derived magnetic pole shape 16d is expanded slightly rather than the mask shape 28, so that it becomes different from that being defined by the design specification.

Figure 22C:
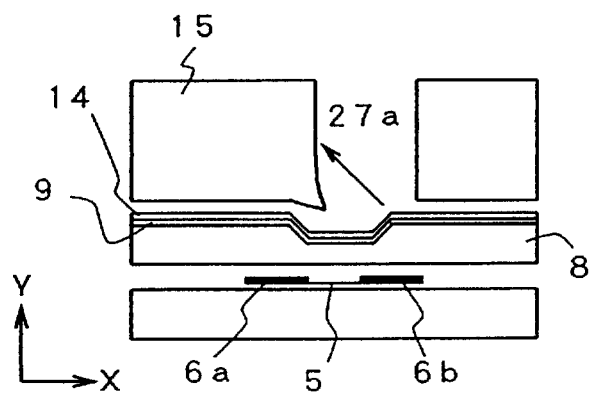
Figure 22D:
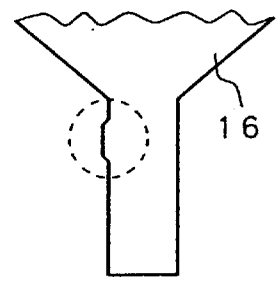

(2) As shown in FIG. 22C, since the magnetic transducer 5 and a pair of terminals 6a, 6b are provided below the tip portion of the magnetic pole, the upper magnetic shielding 8 is not formed as a completely flat surface. As a result, if viewed from the ABS, sometimes the upper magnetic shielding layer 8 is undulated (like a corrugate shape). Therefore, as shown in FIG. 22C, because of the reflected light 27a which is irradiated onto the corrugate portion of the upper magnetic shielding layer 8 from the plating base layer 14, sometimes the predetermined core width Cw cannot be obtained (see FIG. 22D).

(Flow of Operation)

Figure 23:
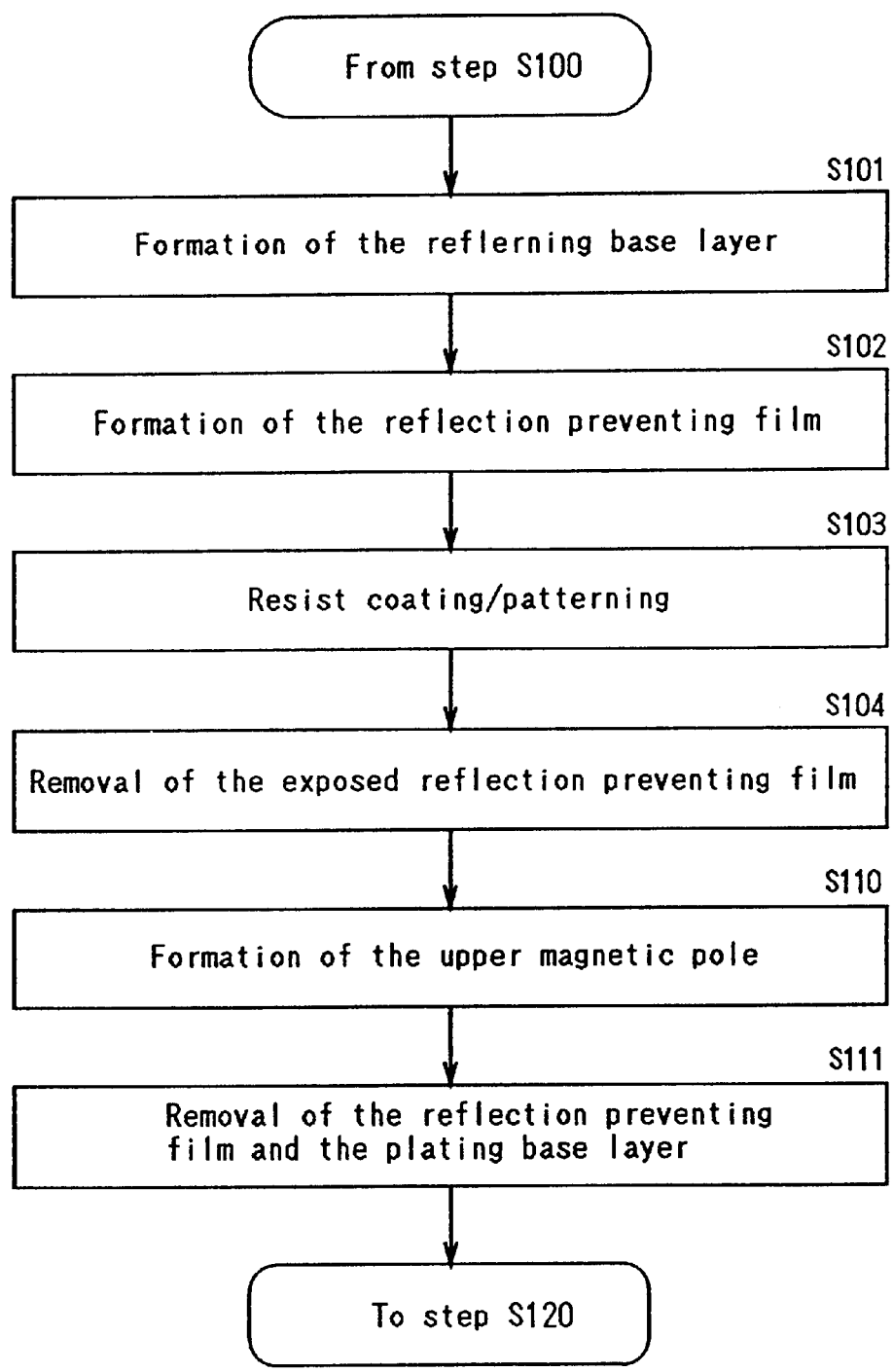
FIG. 23 is a flowchart illustrating an operation to provide a reflection preventing film.

FIG. 23 is a flowchart illustrating an operation to provide the reflection preventing film 31 which can solve these problems. Formation of the reflection preventing film 31 will be explained with reference to FIG. 23.

Figure 24A:
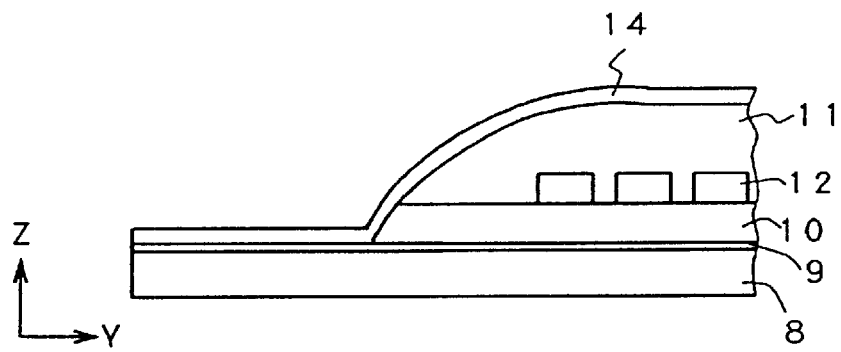
FIGS. 24A to 24F are sectional views showing the magnetic head in steps of forming the reflection preventing film in FIG. 23 respectively.
Figure 24B:
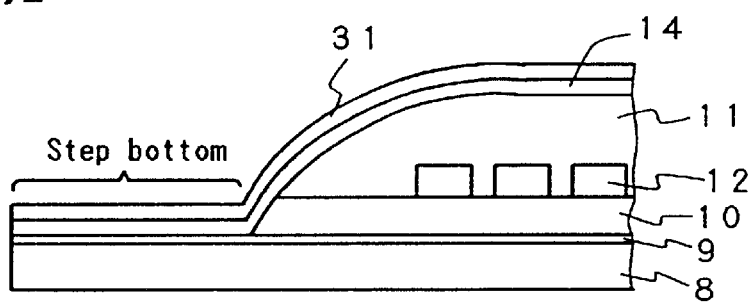

In step S101, as shown in FIG. 24A, the plating base layer 14 is formed. The plating base layer 14 made of NiFe, for example, is formed by the sputtering method, the evaporation method, etc. In step S102, as shown in FIG. 24B, the reflection preventing film 31 is formed on the plating base layer 14. According to the manufacturing method explained in connection with FIG. 5, the photoresist 15 is coated without the reflection preventing film 31 to form the upper magnetic pole 16. However, in the present embodiment, the reflection preventing film 31, if desired, is formed in order to avoid the above-mentioned problems.

As the reflection preventing film 31, either the wet type which is formed by the spin coating or the dry type which is dry-formed may be employed. However, the dry type has advantages that it can be formed thin on the bottom portion of the step and removal of the reflection preventing film 31 can be easily carried out. A carbon film such as diamond like carbon (DLC), for example, may be employed as the dry type.

Figure 24C:
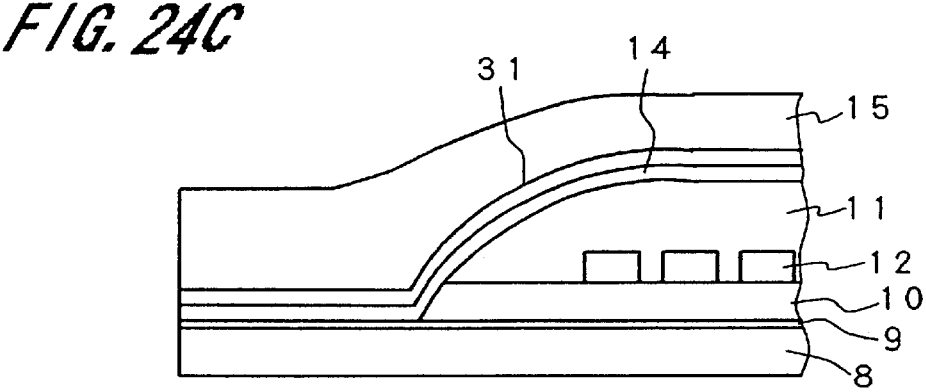
Figure 24D:
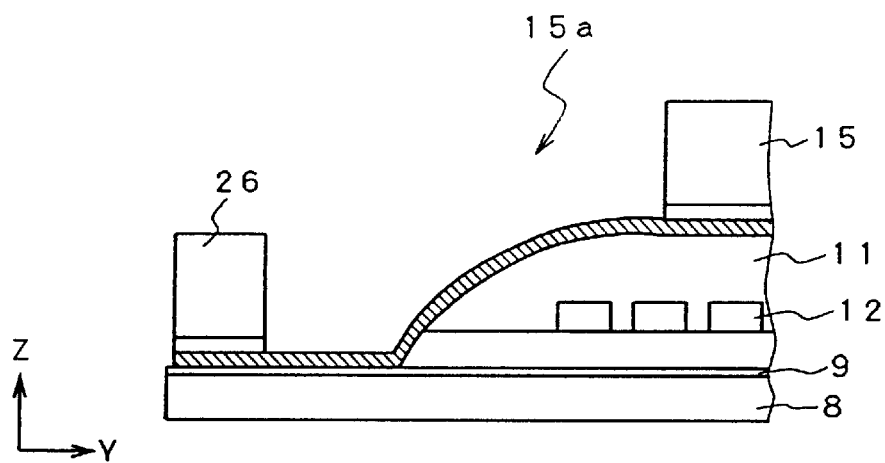

In step S103, as shown in FIG. 24C, photosensitive liquid photoresist 15 is coated by the spin coating method. Then, the photoresist 15 is exposed/developed to be patterned into the shape of the upper magnetic pole 16. At this time, because of the presence of the reflection preventing film 31, the reflected light is not generated from the taper portion of the plating base layer 14, the underlying portion, or the corrugate portion. Therefore. as shown in FIG. 24D, the resist opening 16a which corresponds precisely to the mask shape can be obtained.

In step S104, the reflection preventing film 31 formed in the exposed opening 15a is removed. More particularly, the reflection preventing film 31 is removed by the reactive ion etching (RIE) method using oxygen as the etching gas. If the reactive ion etching is executed under the etching conditions which can provide the anisotropic etching, immersion of the photoresist 15 can be suppressed to the lowest minimum and also extension of the opening 15a of the photoresist 15, which is patterned at the location to decide the core width of the upper magnetic pole 16, can be suppressed to the lowest minimum.

Figure 24E:
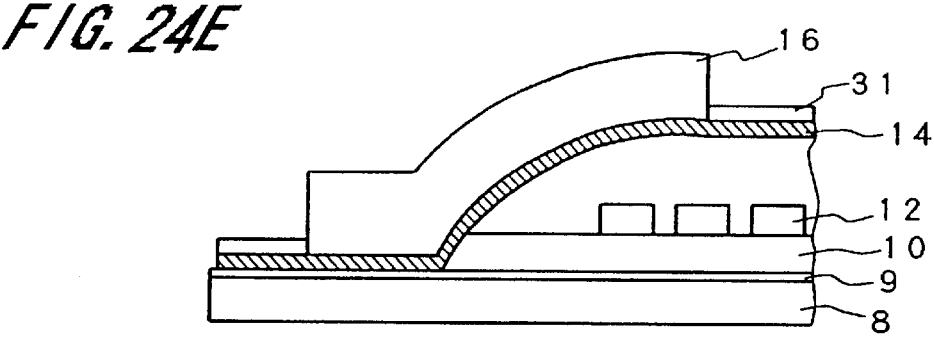

In step S110 (corresponding to step S110 in the manufacturing method in FIG. 5), the upper magnetic pole 16 is formed similarly. In other words, as shown in FIG. 24E, the upper magnetic pole 16 is formed within the opening 15a of the photoresist 15. Thereafter, the photoresist 15 is removed.

Figure 24F:
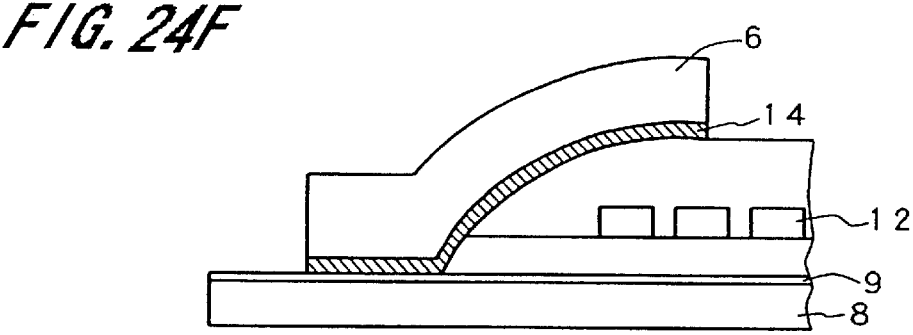

In step S111, as shown in FIG. 24F, the reflection preventing film 31 and the plating base layer 14 positioned on areas other than the area on which the upper magnetic pole 16 is formed are removed.

(Relationship Between a Thickness of the Reflection Preventing Film and Reflectivity)

Figure 25:
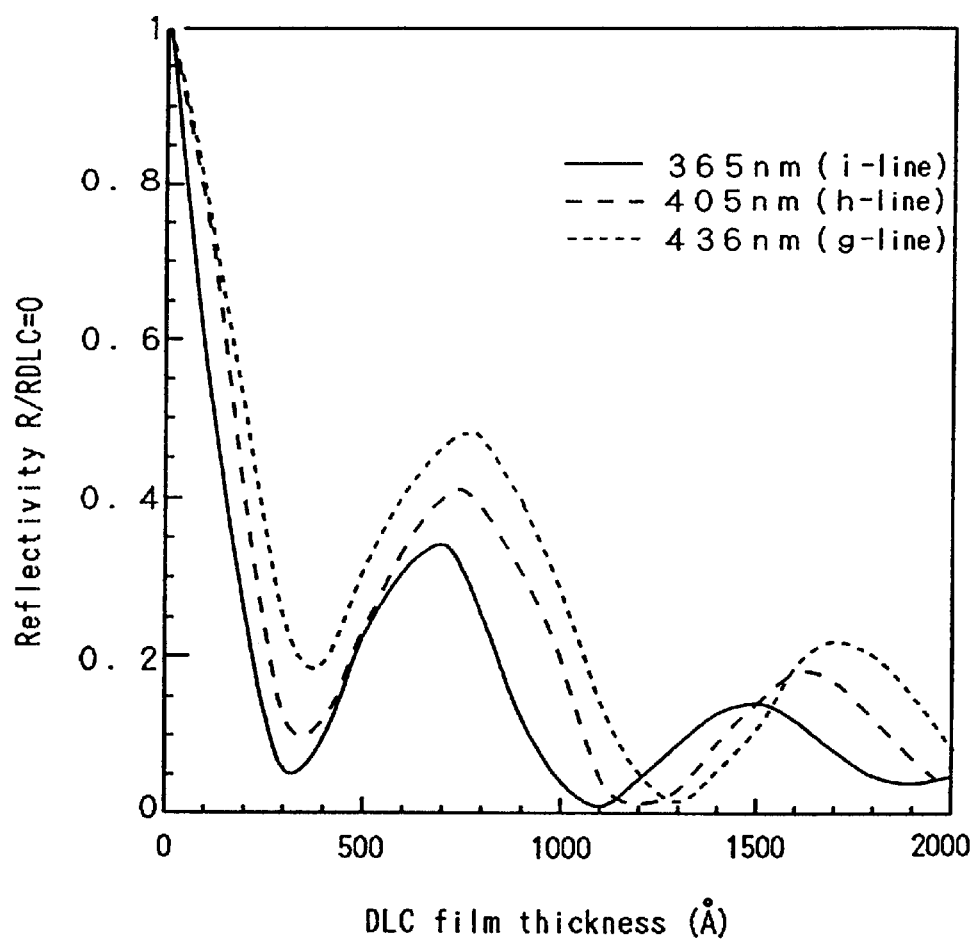
FIG. 25 is a graph showing a film thickness-reflectivity characteristic when DLC is employed as the reflection preventing film.

FIG. 25 is a graph showing a relationship between a film thickness and a reflectivity of the reflection preventing film 31 when DLC is employed as the reflection preventing film 31. Three type of i-line (wavelength λ=365 nm), h-line (wavelength λ=405 nm), and g-line (wavelength λ=436 nm) are employed as the exposure light. A reflectivity $R/R_{DLC=0}$ in the ordinate is normalized with the refrectivity of the plating base film (NiFe film) (i.e., no reflection preventing film is provided). As measuring conditions at this time, a film thickness of the photoresist 15 is 5 μm and the incident angle θ1 of the exposure light is zero degree.

Based on the experience of semiconductor manufacture, it is understood that, if the reflectivity is reduced lower than 50%, the reflected light 27a in no way exposes the photoresist 15. This is sufficient for the reflection preventing effect. In addition, if the film thickness of the reflection preventing film 31 is more than 200 Å, the reflection preventing film 31 can be perform its function fairly without the damage in manufacturing steps.

It can be noted from FIG. 25 that the reflectivity is varied gradually upward and downward as the film thickness of the reflection preventing film 31 is increased. This variation is due to interference of the exposure light with the change in film thickness. Therefore, the film thickness around the maximal value in the film thickness-reflectivity characteristic is sometimes selected according to selection of the light source and the film thickness of the reflection preventing film, and thus the case will often happen where the sufficient reflection preventing effect cannot be attained.

In the present embodiment, after material of the reflection preventing film 31 and the type of the light source in exposure have been decided, the relationship between the film thickness and the reflectivity of the reflection preventing film 31, as shown in FIG. 25, is then measured. It is preferable that, if the film thickness-reflectivity characteristic has been derived, the film thickness around the minimal value of the reflectivity characteristic curve should be selected. In case the film thickness of the reflection preventing film 31 is set to one selected as above, the sufficient reflection preventing effect can be attained.

For instance, if the DLC is employed as the reflection preventing film 31, the film thickness of the DLC is selected near 300 Å or 1100 Å based on FIG. 25 when the light source is the i-line. The film thickness of the DLC is selected near 350 Å or 1200 Å when the light source is the h-line. The film thickness of the DLC is selected near 400 Å or 1300 Å when the light source is the g-line. In this manner, if the film thickness is employed according to the light source, the sufficient reflection preventing effect can be attained.

The reflection preventing film 31 must be removed in step S104 in FIG. 23. Although removal of the reflection preventing film 31 is carried out by the reactive ion etching using oxygen, the photoresist 15 is also etched slightly at that time. If the photoresist 15 is etched, the shape of the upper magnetic pole 16 is deformed. Especially, such a phenomenon is sometimes caused that the core width Cw is expanded. In order to avoid the phenomenon, preferably the film thickness of the DLC is selected in the range of 200 to 600 Å for the i-line and also the film thickness of the DLC is selected in the range of 200 to 800 Å for the g-line. In the event that the minimal value of the characteristic curve shown in FIG. 25 is selected in the ranges according to the i-line or the g-line respectively, the sufficient reflection preventing effect can be attained and also immersion of the photoresist 15 by the etching can be avoided in removing the reflection preventing film 31.

Normally the refractive index n=1.8 to 2.5 and the extinction coefficient k=0.05 to 0.4 are needed as optical constants of the reflection preventing film 31, though different based on film forming conditions. A complex refractive index n+ik=n(1+ik) corresponding to a complex dielectric constant is applied to the medium which is attended with absorption of light. Where n denotes the refractive index and k denotes extinction coefficient, and the light is attenuated as it propagates in the medium.

In addition to the dry type mentioned above, coating type reflection preventing film of the wet type may be employed as the reflection preventing film 31. As the coating type, for example, cyclohexanone may be employed as a major component.

In addition, as the reflection preventing film 31, the multi-layered reflection preventing film may be employed in place of the above single-layered reflection preventing film. For example, $TiO_2/MgF_2/ZnS$ laminated layers are employed as the multi-layered reflection preventing film.

Furthermore, the reflection preventing effect can be attained without the reflection preventing film by making the surface of the interlayer insulating layer 11 rough. In this case, rough-finishing process of the surface of hardened resist serving as the interlayer insulating layer is effected by using the ion milling, FIB, etc. In particular, it is preferable that the reflectivity on the taper portion should be reduced.

[Advantages or Effects of the Invention]

As described above, according to the present invention, there can be provides the noble magnetic head.

Further, according to the present invention, there can be provided the magnetic head having the narrow core width which is suitable for high density recording.

Furthermore, according to the present invention, there can be provided the method of manufacturing the noble magnetic head.

Moreover, according to the present invention, there can be provided the magnetic head having the narrow core width which is suitable for high density recording.

What is claimed is:

1. A composite magnetic head comprising:

a reproducing head; and a recording head;

wherein the recording head includes a lower magnetic pole, a recording gap layer, a nonmagnetic insulating layer into which a recording coil is buried, and an upper magnetic pole, said upper magnetic pole is shaped by a trimming process, said upper magnetic pole has an elongated pole in the vicinity of a floating surface, a fan-shaped portion connected to said elongated pole, and a neck height Nh greater than 0 μm and less than 3.0 μm, the neck height Nh being a height from a floating surface of said elongated pole to said fan-shaped portion, and said elongated pole has a length P1 greater than 2.5 μm and less than 4.5 μm, said pole length P1 being a magnetic pole film thickness formed by the trimming process.

2. A composite magnetic head according to claim 1, wherein said upper magnetic pole has a step height Dh greater than 0 μm and less than 5 μm.

* * * * *